United States Patent
Fukuda

(10) Patent No.: US 9,672,506 B2
(45) Date of Patent: Jun. 6, 2017

(54) PRODUCT IDENTIFICATION APPARATUS WITH DICTIONARY REGISTRATION

(71) Applicant: TOSHIBA TEC KABUSHIKI KAISHA, Tokyo (JP)

(72) Inventor: Masatsugu Fukuda, Kannami Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 348 days.

(21) Appl. No.: 14/455,654

(22) Filed: Aug. 8, 2014

(65) Prior Publication Data
US 2015/0046277 A1  Feb. 12, 2015

(30) Foreign Application Priority Data

Aug. 8, 2013  (JP) .................................. 2013-165179
May 13, 2014  (JP) .................................. 2014-99935

(51) Int. Cl.
*G06K 9/62* (2006.01)
*G06Q 20/20* (2012.01)
*G07G 1/00* (2006.01)

(52) U.S. Cl.
CPC ......... *G06Q 20/208* (2013.01); *G06K 9/6253* (2013.01); *G06K 9/6255* (2013.01); *G07G 1/0063* (2013.01); *G07G 1/0072* (2013.01); *G06K 9/6218* (2013.01); *G06K 2209/17* (2013.01)

(58) Field of Classification Search
CPC ..................... G06T 2207/10016; G06K 9/6218
USPC .................... 705/28, 170, 190; 382/253, 160
See application file for complete search history.

(56) References Cited

U.S. PATENT DOCUMENTS

| 6,282,508 B1 | 8/2001 | Kimura et al. | |
| 2005/0225644 A1* | 10/2005 | Shibuya | G06F 17/30265 348/207.99 |
| 2008/0095448 A1* | 4/2008 | Ono | G06K 9/6857 382/209 |
| 2010/0092093 A1* | 4/2010 | Akatsuka | G06K 9/6211 382/203 |
| 2012/0047037 A1 | 2/2012 | Ueda et al. | |

(Continued)

FOREIGN PATENT DOCUMENTS

JP  2003-173369  6/2003
JP  2010-237886  10/2010

*Primary Examiner* — Hunter Wilder
(74) *Attorney, Agent, or Firm* — Patterson & Sheridan, LLP

(57) ABSTRACT

A product identification apparatus includes a storage device which stores a dictionary including reference data of each of a plurality of products stored in association with identification information of the product, an imaging section which captures image data of a target product, and a processor which performs a dictionary registration process. The processor extracts reference data of the target product from the image data captured by the imaging section. The storage device adds the extracted reference data to previously stored reference data in association with the identification information of the target product. Alternatively, the storage device stores the extracted reference data in association with the identification information of the target product when no reference data is previously stored in association with the identification information of the target product.

17 Claims, 16 Drawing Sheets

(56) References Cited

U.S. PATENT DOCUMENTS

| | | | | |
|---|---|---|---|---|
| 2013/0051667 A1* | 2/2013 | Deng | ............... | G06K 9/00691 |
| | | | | 382/168 |
| 2013/0057692 A1* | 3/2013 | Naito | ............... | G06K 9/00 |
| | | | | 348/150 |
| 2013/0182899 A1* | 7/2013 | Naito | ............... | G06K 9/6201 |
| | | | | 382/103 |

* cited by examiner

| MERCHANDISE ID | MERCHANDISE CLASSIFICATION | MERCHANDISE NAME | VARIETY | UNIT PRICE | ILLUSTRATION IMAGE | FEATURE AMOUNT | GUIDANCE INFORMATION |
|---|---|---|---|---|---|---|---|
| XXXXXXX | VEGETABLE | CARROT | | 100 YEN |  | XXXXXXXX | 1.3 |
| ...... | ...... | ...... | ...... | ...... | ...... | ...... | |
| XXXXXXXX | FRUIT | APPLE | FUJI | 100 YEN |  | XXXXXXXX | 1.2 |
| XXXXXXXX | FRUIT | APPLE | JONAGOLD | 150 YEN |  | XXXXXXXX | 1.2 |
| XXXXXXXX | FRUIT | APPLE | TSUGARU | 200 YEN |  | XXXXXXXX | 1.2 |
| XXXXXXXX | FRUIT | APPLE | JONATHAN | 250 YEN |  | XXXXXXXX | 1.2 |

F1

PRODUCT IDENTIFICATION APPARATUS WITH DICTIONARY REGISTRATION

CROSS-REFERENCE TO RELATED APPLICATION

This application is based upon and claims the benefit of priority from Japanese Patent Application No. 2013-165179, filed Aug. 8, 2013, and Japanese Patent Application No. 2014-99935, filed on May 13, 2014, the entire contents of which are incorporated herein by reference.

FIELD

Embodiments described herein relate generally to a product identification apparatus with dictionary registration, a store system, and a program.

BACKGROUND

In related art, there is a technology relating to generic object recognition for recognizing a class and the like of a product according to a degree of similarity obtained by comparing features of a target product (such features being extracted from image data acquired by an image sensor device) and reference data registered in a dictionary which is prepared in advance. In addition, a store system may allow for sales registration of identified products by applying the technology according to the generic object recognition to identification of products such as fruits and vegetables.

Further, in the technology according to the generic object recognition, not only the category of the product is determined, but a variety is also recognized (detected).

In the dictionary used in the generic object recognition, the reference data is registered in advance.

However, the products, such as fruits and vegetables, which are recognition targets of the generic object recognition may have different textures or colors of surfaces depending on product regions, even if the products are of the same type. When the textures or colors of surfaces are different although the products are of the same type, a degree of similarity obtained by comparing the image of the product with the reference data registered in a dictionary in advance may be decreased, and an object recognition rate may be decreased.

DETAILED DESCRIPTION

Embodiments provide an information processing apparatus, a store system, and a program capable of performing new registration and additional registration of reference data in a dictionary.

A product identification apparatus includes a storage device which stores a dictionary including reference data of each of a plurality of products stored in association with identification information of the product, an imaging section that captures image data of a target product, and a processor that performs a dictionary registration process. The processor extracts reference data of the target product from the image data captured by the imaging section. The storage device adds the extracted reference data to previously stored reference data in association with the identification information of the target product. Alternatively, the storage device stores the extracted reference data in association with the identification information of the target product when no reference data is previously stored in association with the identification information of the target product.

Hereinafter, the information processing apparatus, the store system, and the program according to the embodiment will be described with reference to the drawings, using a checkout system as an example. The store system is a checkout system, commonly referred to as a point-of-sale (POS) system. The checkout system includes a POS terminal which performs registration and payment of merchandise according to one transaction. The embodiment is an example to be applied to a checkout system which may be used in a store such as a supermarket.

Figure 1:
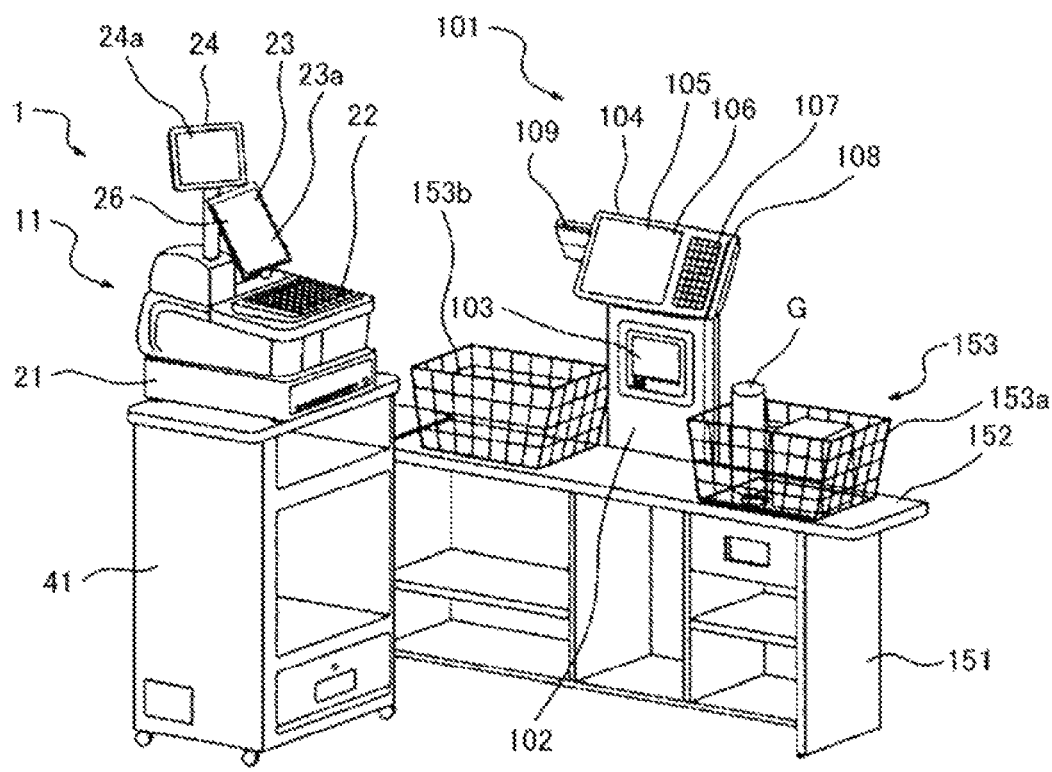
FIG. 1 is a perspective view illustrating an example of a checkout system according to an embodiment.

FIG. 1 is a perspective view illustrating an example of a checkout system 1. As illustrated in FIG. 1, the checkout system 1 includes a merchandise reading device 101 which reads information relating to merchandise, and a POS terminal 11 which performs registration and payment of merchandise according to one transaction. Hereinafter, an example of the POS terminal 11, as the information processing apparatus according to the embodiment, will be described.

The POS terminal 11 is positioned on an upper surface of a drawer 21 on a checkout table 41. An opening operation of the drawer 21 is controlled by the POS terminal 11. A keyboard 22 is operated by being pressed by an operator (salesperson). The keyboard 22 is disposed on the upper surface of the POS terminal 11. A display device 23 which displays information to an operator is provided on the far side with respect to the keyboard 22, from the operator who operates the keyboard 22. The display device 23 displays information on a display surface 23a thereof. A touch panel 26 is integrally formed on the display surface 23a. A customer display device 24 is rotatably mounted on the farther side with respect to the display device 23. The customer display device 24 displays information on a display surface 24a thereof. In addition, although the display surface 24a of the customer display device 24 illustrated in FIG. 1 faces the front side of FIG. 1, the customer display device 24 can display information towards a customer by rotating the customer display device 24 so that the display surface 24a faces the back side of FIG. 1.

A counter table 151 having a shape of a horizontally long table, is disposed so as to form an L shape with the checkout table 41 on which the POS terminal 11 is loaded. A load surface 152 is formed on the upper surface of the counter table 151. A shopping basket 153 for accommodating merchandise G is loaded on the load surface 152. The shopping basket 153 may be include a first shopping basket 153a which is brought by a customer, and a second shopping basket 153b which is loaded on a position by interposing the merchandise reading device 101 between the first shopping basket 153a and the second shopping basket. In addition, the shopping basket 153 is not limited to have a so-called basket shape, and may be a tray and the like. Further, the shopping basket 153 (second shopping basket 153b) is not limited to have a so-called basket shape, and may have a box shape or a bag shape.

The merchandise reading device 101 is connected to the POS terminal 11 so as to transmit and receive data. The merchandise reading device 101 is installed on the load surface 152 of the counter table 151. The merchandise reading device 101 includes a thin rectangular housing 102. A reading window 103 is disposed on a front surface of the housing 102. A display and operation unit 104 is attached to an upper portion of the housing 102. A display device 106, which is a display unit with a touch panel 105 integrally formed on the surface, is provided on the display and operation unit 104. A keyboard 107 is disposed on the right side of the display device 106. A card reading groove 108 of a card reader (not illustrated) is provided on the right side of the keyboard 107. A customer display device 109 for providing information to a customer is installed on the left deep side and on the back surface of the display and operation unit 104 from the operator.

Figure 2:
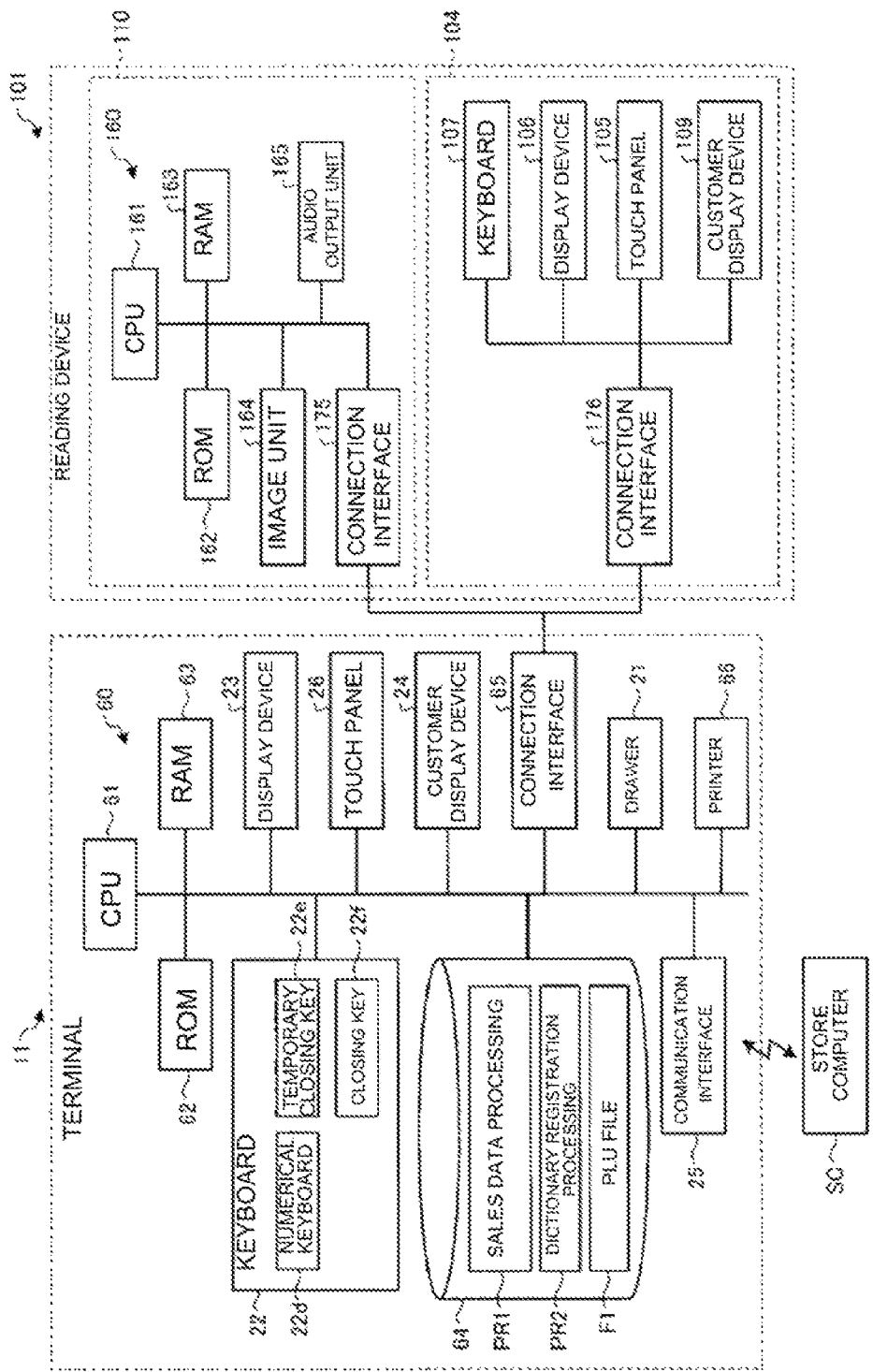
FIG. 2 is a block diagram illustrating a hardware configuration of a POS terminal and a merchandise reading device.

Such a merchandise reading device 101 includes a merchandise reading unit 110 (see FIG. 2). The merchandise reading unit 110 includes an imaging unit 164 (see FIG. 2) disposed within the reading window 103.

Merchandise G for one transaction is accommodated in the first shopping basket 153a which is brought by a customer. The merchandise G in the first shopping basket 153a is moved to the second shopping basket 153b by an operator who operates the merchandise reading device 101. The merchandise G is directed to the reading window 103 of the merchandise reading device 101 during this movement process. At that time, the imaging unit 164 (see FIG. 2) disposed in the reading window 103 captures an image of the merchandise G.

In the merchandise reading device 101, a screen for designating a merchandise registered in a PLU file F1 (see FIG. 3, which will be described later) that corresponds to the merchandise G included in the image captured by the imaging unit 164, is displayed on the display and operation unit 104. A merchandise ID of the designated merchandise is sent to the POS terminal 11. In the POS terminal 11, information relating to sales registration—such as merchandise classification, a merchandise name, a unit price, and the like—of the merchandise corresponding to the merchandise ID are recorded in a sales master file (not illustrated) and the like, based on the merchandise ID sent from the merchandise reading device 101, to perform the sales registration.

FIG. 2 is a block diagram illustrating a hardware configuration of the POS terminal 11 and the merchandise reading device 101. The POS terminal 11 includes a microcomputer 60 as an information processing unit which executes an information process. In the microcomputer 60, a read only memory (ROM) 62 and a random access memory (RAM) 63 are connected to a central processing unit (CPU) 61 which executes various operation processes to control each unit, via a bus.

The drawer 21, the keyboard 22, the display device 23, the touch panel 26, and the customer display device 24 are connected to the CPU 61 of the POS terminal 11 through various input and output circuits (not illustrated), and they are controlled by the CPU 61.

The keyboard 22 includes a numerical keypad 22d on which numbers such as "1", "2", "3", . . . and an operator of an operation such as "x" are displayed on an upper surface, a temporary closing key 22e, and a closing key 22f.

A hard disk drive (HDD) 64 is connected to the CPU 61 of the POS terminal 11. Programs or various files are stored in the HDD 64. When starting the POS terminal 11, the entirety or a part of the programs or various files stored in the HDD 64 are copied to the RAM 63 and executed by the CPU 61. An example of the program stored in the HDD 64 is a program PR1 for sales data processing or a program PR2 for dictionary registration processing. An example of the file stored in the HDD 64 is the PLU file F1 which is stored by being delivered from a store computer SC.

The PLU file F1 is a merchandise file which stores information relating to sales registration of the merchandise G, for each merchandise item G which is displayed in a store for sales. In the following description, the PLU file F1 is used as the dictionary, but the dictionary may be a file different from the PLU file F1. The dictionary stores reference data (e.g., features) of the merchandise extracted from the captured image data. When the dictionary is a file different from the PLU file F1, the reference data to be stored in the dictionary and identification information of the PLU file F1 are linked to each other. The feature amount is a parameter of a feature of appearance such as a standardized shape of the merchandise, a color, a pattern, or an irregularity situation of a surface.

The number of the reference data items to be registered in the dictionary for each merchandize item G is limited to a number less than a predetermined threshold value. If the number of data items is equal to or greater than the predetermined threshold value, the CPU 61 removes one or more of the reference data items so that the number of the reference data items is not equal to or greater than the threshold value. The removal of the reference data may be performed so as to remove oldest reference data items in order, or may be performed so as to randomly remove the reference data items. In addition, the threshold value of the reference data to be registered in the dictionary is not limited to the number, and may be capacitance of the reference data.

Figure 3:
FIG. 3 illustrates an example data configuration of a PLU file.
Figure 3:
Figure 3:
Figure 3:
Figure 3:

FIG. 3 is a conceptual diagram illustrating a data configuration of the PLU file F1. As illustrated in FIG. 3, the PLU file F1 is a file which stores the information relating to merchandise such as the merchandise ID which is an identification information uniquely allocated to each merchandise item G, the merchandise classification to which the merchandise G belongs, the merchandise name, and the unit price, the illustration image illustrating the merchandise, and the feature amount of the color or the irregularity situation of the surface read from the imaged merchandise image, as merchandise information of the merchandise G. In addition, the feature amount is reference data used for determination of a degree of similarity (which will be described later). Further, the PLU file F1 may be read out by the merchandise reading device 101, through a connection interface 65 (which will be described later).

In addition, as illustrated in FIG. 3, the PLU file F1 stores guidance information (which will be described later) with respect to each merchandise item.

When it is necessary to recognize not only the category of the product, but also the variety thereof in the PLU file F1, as illustrated in FIG. 3, the information relating to the merchandise such as the merchandise name or the unit price, the illustration image illustrating the merchandise, and the feature amount are managed for each variety. For example, when the category (merchandise) of the product is an "apple", the information relating to the merchandise such as the merchandise name or the unit price, the illustration image illustrating the merchandise, and the feature amount are managed for each variety such as "Fuji", "Jonagold", "Tsugaru", and "Jonathan". When displaying the candidates with characters, without using the illustration image for the display of the candidates, it is not necessary to store the illustration image in the PLU file F1.

By returning to FIG. 2, a communication interface 25 for executing data communication with the store computer SC is connected to the CPU 61 of the POS terminal 11 through an input and output circuit (not illustrated). The store computer SC is installed in a backyard or the like of the store. The PLU file F1 which is delivered to the POS terminal 11 is stored to an HDD (not illustrated) of the store computer SC.

In addition, the connection interface 65 which allows data transmission and reception to and from the merchandise reading device 101 is connected to the CPU 61 of the POS terminal 11. The merchandise reading device 101 is connected to the connection interface 65. In addition, a printer 66 which performs printing on a receipt or the like is connected to the CPU 61 of the POS terminal 11. The POS terminal 11 prints transaction content for one transaction on a receipt, under the control of the CPU 61.

The merchandise reading device 101 further includes a microcomputer 160. In the microcomputer 160, an ROM 162 and an RAM 163 are connected to a CPU 161 by a bus. A program executed by the CPU 161 is stored in the ROM 162. The imaging unit 164 and an audio output unit 165 are connected to the CPU 161 through various input and output circuits (not illustrated). The operations of the imaging unit 164 and the audio output unit 165 are controlled by the CPU 161. The display and operation unit 104 is connected to the merchandise reading unit 110 and the POS terminal 11 through a connection interface 176. The operation of the display and the operation unit 104 is controlled by the CPU 161 of the merchandise reading unit 110 and the CPU 61 of the POS terminal 11.

The imaging unit 164 is a color CCD image sensor or a color CMOS image sensor, and is an imaging section which performs imaging from the reading window 103 under the control of the CPU 161. For example, the imaging unit 164 captures images at 30 fps, for example. Frame images (captured images) which are sequentially imaged by the imaging unit 164 at a predetermined frame rate are held in the RAM 163.

The audio output unit 165 is an audio circuit and a speaker for generating a predetermined warning sound. The audio output unit 165 performs notification with the warning sound or audio under the control of the CPU 161.

In addition, a connection interface 175 which is connected to the connection interface 65 of the POS terminal 11 and allows data transmission and reception to and from the POS terminal 11, is connected to the CPU 161. Further, the CPU 161 performs data transmission and reception to and from the display and operation unit 104 through the connection interface 175.

Next, functional configurations of the CPU 161 and the CPU 61 achieved by the program executed by the CPU 161 and the CPU 61 will be described with reference to FIG. 4.

Figure 4:
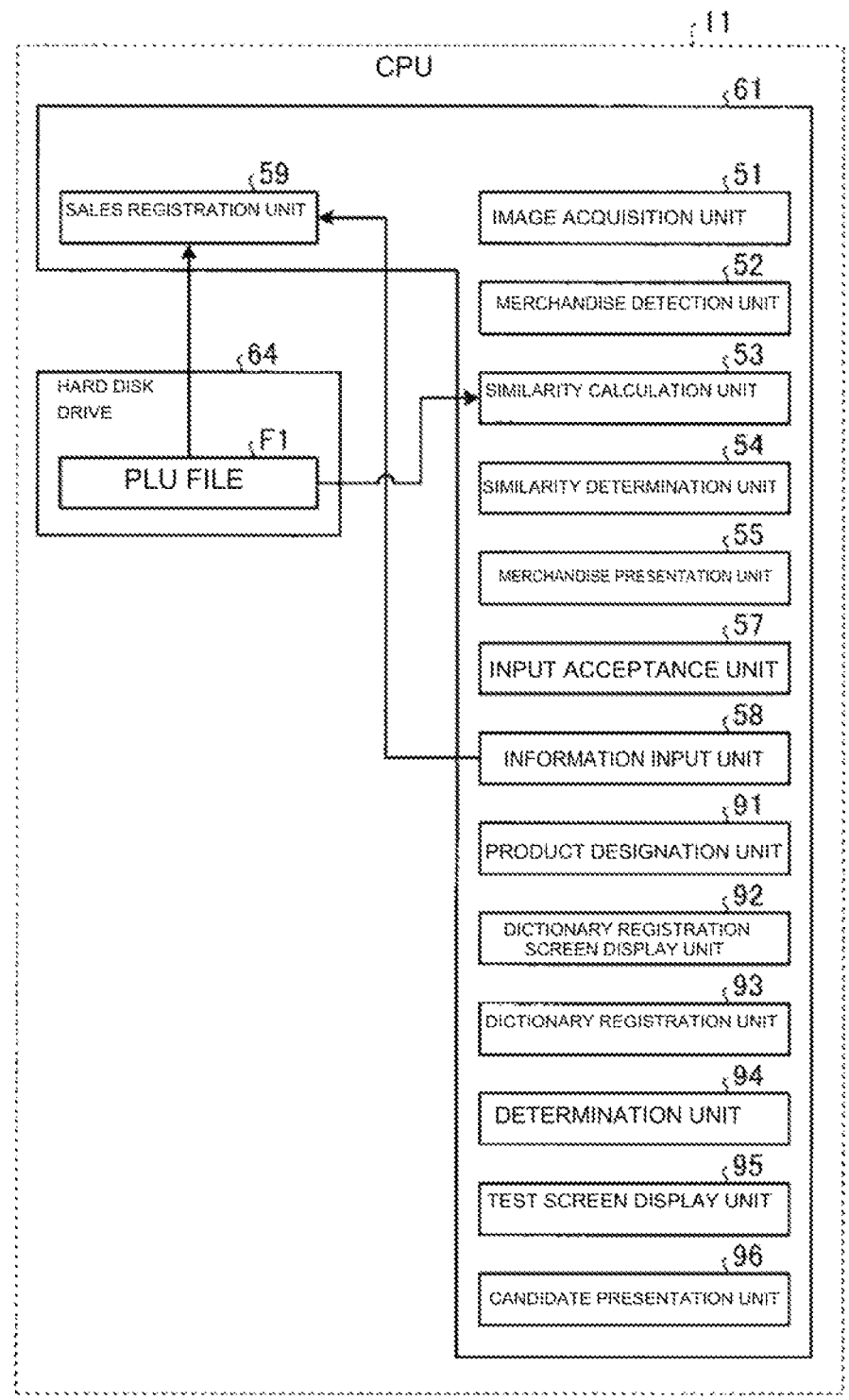
FIG. 4 is a block diagram illustrating a functional configuration of a POS terminal.

FIG. 4 is a block diagram illustrating a functional configuration of the POS terminal 11. As illustrated in FIG. 4, the CPU 61 of the POS terminal 11 executes the program PR1 for sales data processing and the program PR2 for dictionary registration processing. Accordingly, the CPU 61 functions as an image acquisition unit 51, a merchandise detection unit 52, a degree of similarity calculation unit 53, a degree of similarity determination unit 54, a merchandise presentation unit 55, an input acceptance unit 57, an information input unit 58, a sales registration unit 59 (which is a sales registration processing section), a product designation unit 91, a dictionary registration screen display unit 92, a dictionary registration unit 93, a determination unit 94, a test screen display unit 95, and a candidate presentation unit 96.

Merchandise Registration Processing and Sales Registration Processing

First, outlines of a merchandise registration processing according to a generic object recognition by the image acquisition unit 51, the merchandise detection unit 52, the degree of similarity calculation unit 53, the degree of similarity determination unit 54, the merchandise presentation unit 55, the input acceptance unit 57, and the information input unit 58 of the POS terminal 11, and a sales registration processing by the sales registration unit 59 will be described.

The image acquisition unit 51 functions as an acquisition section, and outputs an imaging-on signal to the imaging unit 164 to allow the imaging unit 164 to start an imaging operation. The image acquisition unit 51 sequentially acquires frame images which are imaged by the imaging unit 164 and held in the RAM 163, after starting the imaging operation. Acquiring of the frame images by the image acquisition unit 51 is performed in the order held in the RAM 163.

Figure 5:
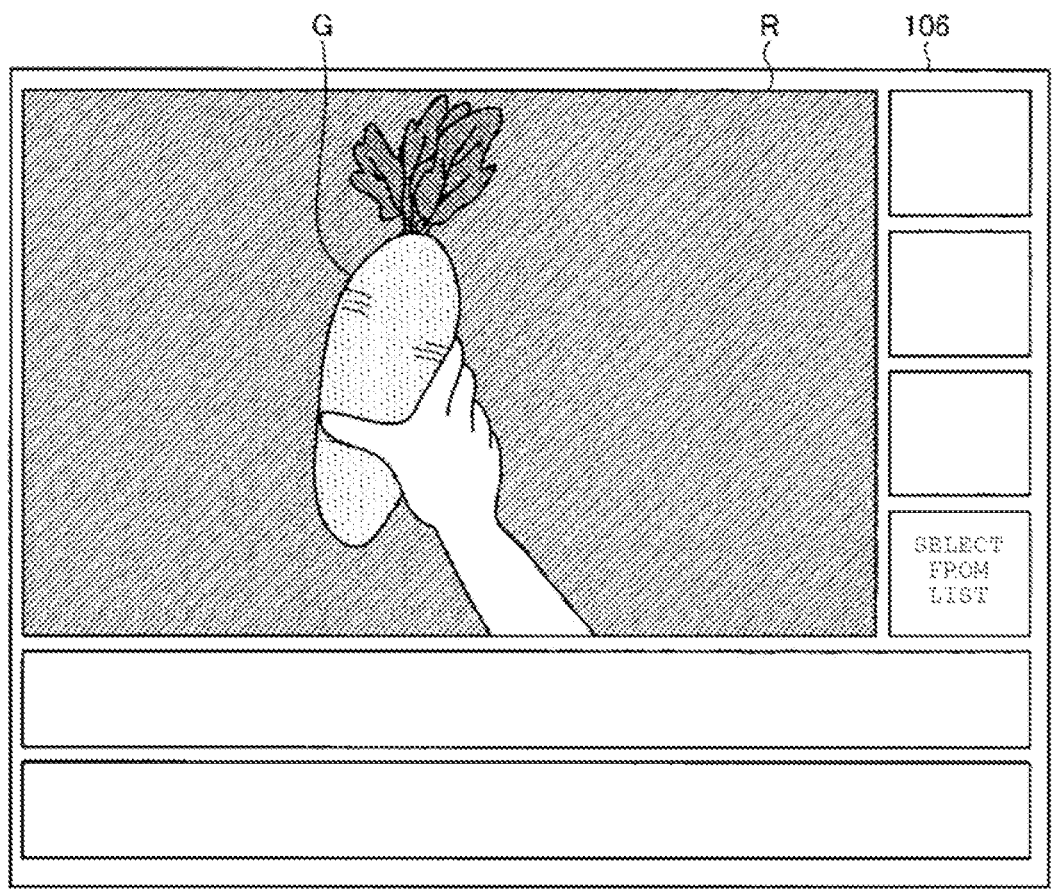
FIG. 5 illustrates an example of frame images.

FIG. 5 is a diagram illustrating an example of the frame images acquired by the image acquisition unit 51. As illustrated in FIG. 5, when an operator holds up the merchandise G to the reading window 103, the entirety or a part of the merchandise G is imaged in a reading area R of the imaging unit 164 and is displayed on the display device 106 of the merchandise reading device 101.

The merchandise detection unit 52 detects the entirety or a part of the merchandise G included in the frame image acquired by the image acquisition unit 51 using a pattern matching technology or the like, and extracts the feature amount of the imaged merchandise. In detail, an outline or the like is extracted from an image obtained by binarizing the acquired frame image. Next, the merchandise facing the reading window 103 is detected for sales registration, by comparing the outline extracted from the previous frame image and the outline extracted from the current frame image.

In addition, as another method of detecting the merchandise, presence or absence of a skin color area is detected from the acquired frame image. Next, when the skin color area is detected, that is, when a hand of a salesperson is detected, by performing detection of the outline described above in the vicinity of this skin color area, the outline extraction of the merchandise assumed to be held by a hand of a salesperson is attempted. At that time, when the outline showing the shape of the hand and the outline of the other object in the vicinity of the outline of the hand are detected, the merchandise is detected from the outline of the object.

The degree of similarity calculation unit 53 functions as a degree of similarity calculation section, and reads the state of the surface such as the color of the merchandise G or irregularity aspect of the surface, as feature amounts, from the entirety or a part of the merchandise G imaged by the imaging unit 164. In addition, for the degree of similarity calculation unit 53, the outline or the size of the merchandise G is not considered, in order to reduce the processing time.

The degree of similarity calculation unit 53 compares the feature amount—which is the state of the surface such as the color of the merchandise image or irregularity aspect of the surface of each merchandise item registered in the PLU file F1 (hereinafter, referred to as registered merchandise item)—to the feature amount of the merchandise G, to calculate a degree of similarity of the merchandise G and the registered merchandise which is registered in the PLU file F1. Herein, the degree of similarity shows how much the entirety or a part of the image of the merchandise G is similar to registered merchandise, such that the merchandise image upon merchandise registration of each merchandise item stored in the PLU file F1 is set to 100%="degree of similarity: 1.0". In addition, for example, the degree of similarity thereof may be calculated by changing the weight of the color and the irregularity aspect of the surface.

Recognizing the object included in the image as described above is called generic object recognition. Regarding such generic object recognition, various recognition technologies are known.

In addition, a technology for performing generic object recognition by performing area division of the image for each object is known.

The method of calculating the degree of similarity of the captured image of the merchandise G and the registered merchandise which is registered in the PLU file F1 is not particularly specified. For example, the degree of similarity of the captured image of the merchandise G and each registered merchandise item which is registered in the PLU file F1 may be calculated by absolute evaluation or by relative evaluation.

When calculating the degree of similarity by absolute evaluation, the captured image of the merchandise G and each registered merchandise item which is registered in the PLU file F1 maybe compared one on one, and the degree of similarity calculated as a result thereof may be employed as it is. In addition, when calculating the degree of similarity by relative evaluation, when it is assumed that five registered merchandise items (merchandise items GA, GB, GC, GD, and GE) are registered in the PLU file F1, the sum of the degrees of similarity of the captured merchandise G and the registered merchandise items may be calculated to be 1.0 (100%), for example by calculating the degree of similarity of the merchandise G with respect to the merchandise GA as 0.6, the degree of similarity thereof with respect to the merchandise GB as 0.1, the degree of similarity thereof with respect to the merchandise GC as 0.1, the degree of similarity thereof with respect to the merchandise GD as 0.1, and the degree of similarity thereof with respect to the merchandise GE as 0.1.

The degree of similarity determination unit 54 functions as a determination section, and compares the degrees of the image of the merchandise G and the registered merchandise items registered in the PLU file F1, for each frame image acquired by the image acquisition unit 51. In the embodiment, a plurality of conditions are provided in a stepwise manner for the degree of similarity of the merchandise image of the registered merchandise and the image of the merchandise G. The degree of similarity determination unit 54 determines the registered merchandise or selects of candidates of the merchandise based on the satisfied conditions. The conditions relating to the degree of similarity are not particularly limited, and a case of using conditions A, B, C and D will be described hereinafter.

Herein, the condition A and the condition B are a first condition according to the embodiment and are conditions for deciding the merchandise G imaged by the imaging unit 164 as one merchandise item of the registered merchandise items which are registered in the PLU file F1. The condition C is a second condition according to the embodiment, and is a condition for extracting candidates of the merchandise G imaged by the imaging unit 164, when a plurality of products of different varieties belonging to the same category (merchandise) are not included in the registered merchandise items which are registered in the PLU file F1. The condition D is a third condition according to the embodiment, and is a condition for extracting candidates of the merchandise G imaged by the imaging unit 164, when a plurality of products of different varieties belonging to the same category (merchandise) are included in the candidates of merchandise which satisfies the condition C.

The degree of similarity determination unit 54 determines that the registered merchandise which satisfies the condition A or the condition B is a merchandise item (hereinafter, referred to as a determined merchandise item) corresponding to the merchandise G imaged by the imaging unit 164 one on one. In addition, the degree of similarity determination unit 54 determines that the registered merchandise which satisfies the condition C is a candidate (hereinafter, referred to as a merchandise candidate) for the merchandise G imaged by the imaging unit 164, not the determined merchandise. By extracting the registered merchandise items which satisfy the condition c from the plurality of registered merchandise items which are registered in the PLU file F1, the merchandise candidates with respect to the merchandise G are extracted.

The degree of similarity determination unit 54 also determines that the registered merchandise items (products of different varieties belonging to the same category) which satisfy the condition d are the candidates for the merchandise G imaged by the imaging unit 164, not the determined merchandise. By extracting the registered merchandise items which satisfy the condition D from the plurality of registered merchandise items which are registered in the PLU file F1, the merchandise candidates with respect to the merchandise G are extracted.

The details of the conditions A to C are not particularly limited as long as the conditions are set according to the degree of similarity in a stepwise manner. As an example, the conditions A to C may be provided with a plurality of threshold values which are set in advance. Herein, a case of setting the conditions A to C with a first threshold value to a third threshold value will be described. In addition, a magnitude correlation of the first to third threshold values is set to satisfy that first threshold value >second threshold value>third threshold value.

The degree of similarity determination unit 54 counts the number of times that the degree of similarity of the registered merchandise and the merchandise G reached or exceeded the first threshold value (for example, 90%), and determines that the condition A is satisfied when the number of times thereof is equal to or greater than the predetermined number of times. When the first threshold value is set sufficiently high so as not to have erroneous determination, the determination with the condition a may be performed by setting the predetermined number of times as 1.

The degree of similarity determination unit 54 determines that the condition B is satisfied when the degree of similarity of the registered merchandise and the merchandise G is smaller than the first threshold value (for example, 90%) and is equal to or greater than the second threshold value (for example, 75%) which is smaller than the first threshold value. It is determined that the registered merchandise which satisfied the condition B is the determined merchandise but a confirmation operation by an operator is necessary. The degree of similarity determination unit 54 may count the number of times that the degree of similarity of the registered merchandise and the merchandise G has not reached the first threshold value (for example, 90%) and has reached the second threshold value (for example, 75%) smaller than the first threshold value or more. The degree of similarity determination unit 54 may determine that the condition B is satisfied when the number of times thereof is equal to or greater than the predetermined number of times.

The degree of similarity determination unit 54 determines that the condition C is satisfied when the similarity of the registered merchandise and the merchandise G is smaller than the second threshold value (for example, 75%) and is equal to or greater than the third threshold value (for example, 10%) which is smaller than the second threshold value. The degree of similarity determination unit may count the number of times that the degree of similarity of the registered merchandise and the merchandise G has not reached the second threshold value (for example, 75%) and has reached the third threshold value (for example, 10%) smaller than the second threshold value or more, and may determine that the condition C is satisfied when the number of times thereof is equal to or greater than the predetermined number of times.

The conditions A to C may be suitably set based on the size of the similarity, the number of times of determination, and the like, and are not limited to the examples described above. For the predetermined number of times used in determination of the conditions A to C, the different number of times may be provided for each condition.

In addition, the degree of similarity determination unit 54 adds the degrees of similarity of a plurality of varieties when a plurality of products of different varieties belonging to the same category (merchandise) are included in the registered merchandise items which satisfied the condition C, and determines that the condition D is satisfied when the degree of similarity of the category (merchandise) obtained by adding up the degrees of similarity of the plurality of varieties is equal to or greater than the predetermined second threshold value (for example, 75).

The merchandise presentation unit 55 functions as a notification section, and provides a notification that the merchandise imaged by the imaging unit 164 is uniquely determined to be the registered merchandise which satisfied the condition A or the condition B. The notification is provided to an operator or a customer by image output or audio output.

The merchandise presentation unit 55 allows the display device 106 to display a decision screen 71 (see FIG. 6) showing that the registered merchandise which satisfied the condition A is uniquely determined to be the merchandise (determined merchandise) imaged by the imaging unit 164.

Figure 6:
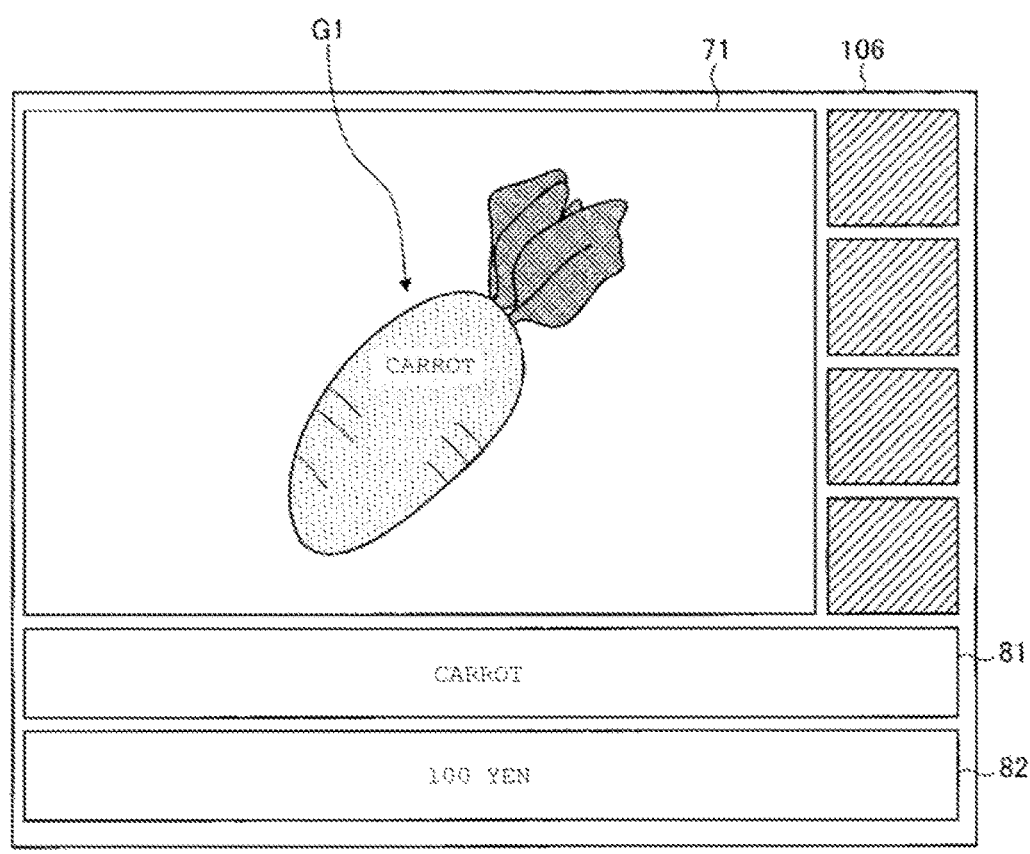
FIG. 6 illustrates an example of a decision screen.

FIG. 6 illustrates an example of the decision screen 71. When the registered merchandise satisfies the condition A, the merchandise presentation unit 55 stops display of the captured image of the reading area R (see FIG. 5), and then reads out an illustration image G1 and a merchandise name "carrot" (corresponding to the determined merchandise from the PLU file F1) to display those on the decision screen 71. The merchandise presentation unit 55 displays the merchandise name and the merchandise price (unit price) of the determined merchandise read out from the PLU file F1 on a merchandise name display area 81 and a price display area 82, respectively. The merchandise presentation unit 55 may display a merchandise image (photograph) readout from the PLU file F1, instead of the illustration image G1. Alternatively, the merchandise presentation unit may display the merchandise name on the decision screen 71, without displaying the illustration or the merchandise image. In this case, the fact that the merchandise is determined is notified by the audio output unit 165. The audio may be a sound of the merchandise name which is registered by being linked to the merchandise in advance, or may be a bleep, for example.

The merchandise presentation unit 55 allows the display device 106 to display a confirmation screen 72 (see FIG. 7) for accepting a final confirmation operation of determining whether or not the registered merchandise (determined merchandise) which satisfied the condition B is the merchandise G imaged by the imaging unit 164.

Figure 7:
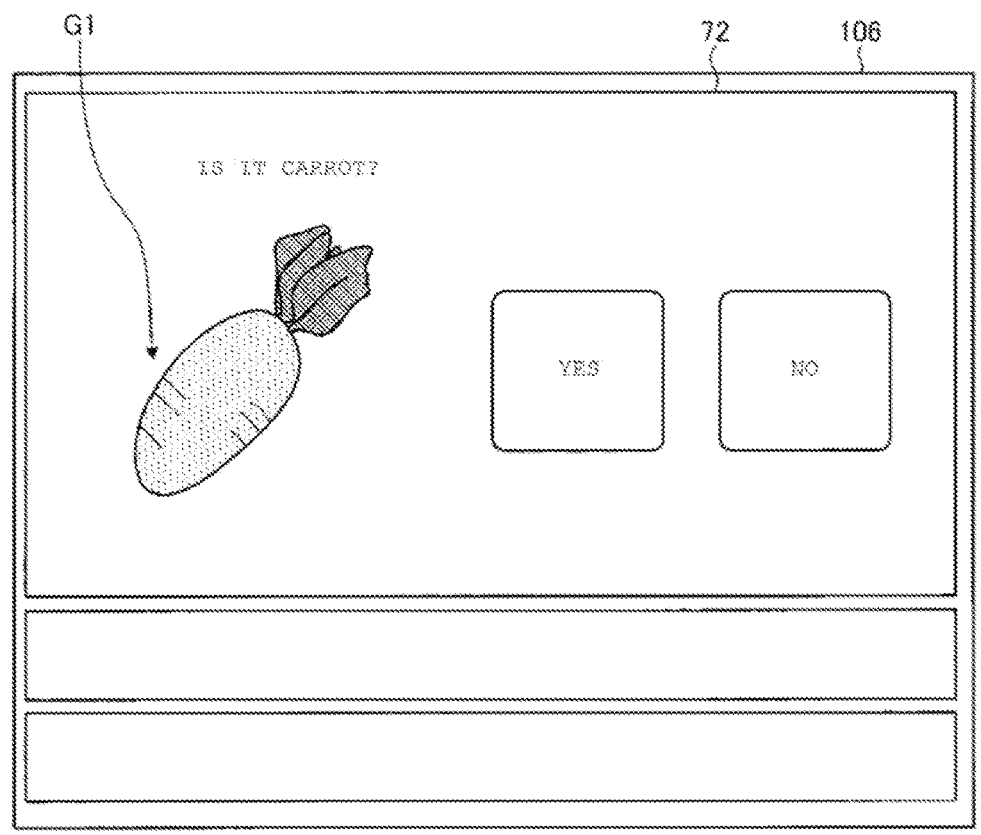
FIG. 7 illustrates an example of a confirmation screen.

FIG. 7 illustrates an example of the confirmation screen 72. When there is the registered merchandise which satisfies the condition B, the merchandise presentation unit 55 reads out the illustration image G1 corresponding to the determined merchandise from the PLU file F1 to display the illustration image on the confirmation screen 72. The merchandise presentation unit 55 displays a message "is it a carrot?" asking whether or not the read merchandise G is the merchandise of the illustration image G1, by using the merchandise name of the determined merchandise read out from the PLU file F1. Buttons such as "Yes/No" are provided on the confirmation screen 72 so as to perform the selection operation by a touch operation with respect to the touch panel 105.

As described above, the merchandise name or the merchandise image of the registered merchandise (determined merchandise) which is only selected with respect to one merchandise item G as a result of the determination of the degree of similarity, is shown on the confirmation screen 72, and is displayed with one-on-one relationship between the merchandise G and the registered merchandise. Accordingly, the confirmation screen 72 provides notification that the registered merchandise which satisfies the condition B is uniquely determined as the merchandise G imaged by the imaging unit 164.

In addition, the merchandise presentation unit 55 allows the display device 106 to display the information relating to the registered merchandise which satisfies the condition C as merchandise candidates. The merchandise presentation unit 55 reads out the illustration images and the merchandise names of the registered merchandise items which satisfy the condition C from the PLU file F1, and outputs those in order of degree of similarity calculated by the degree of similarity calculation unit 53 to the display device 106. The display device 106 displays the illustration images and the merchandise names of the merchandise candidates, in order of the degree of similarity, in a merchandise candidate presentation area 83 (see FIG. 8).

Figure 8:
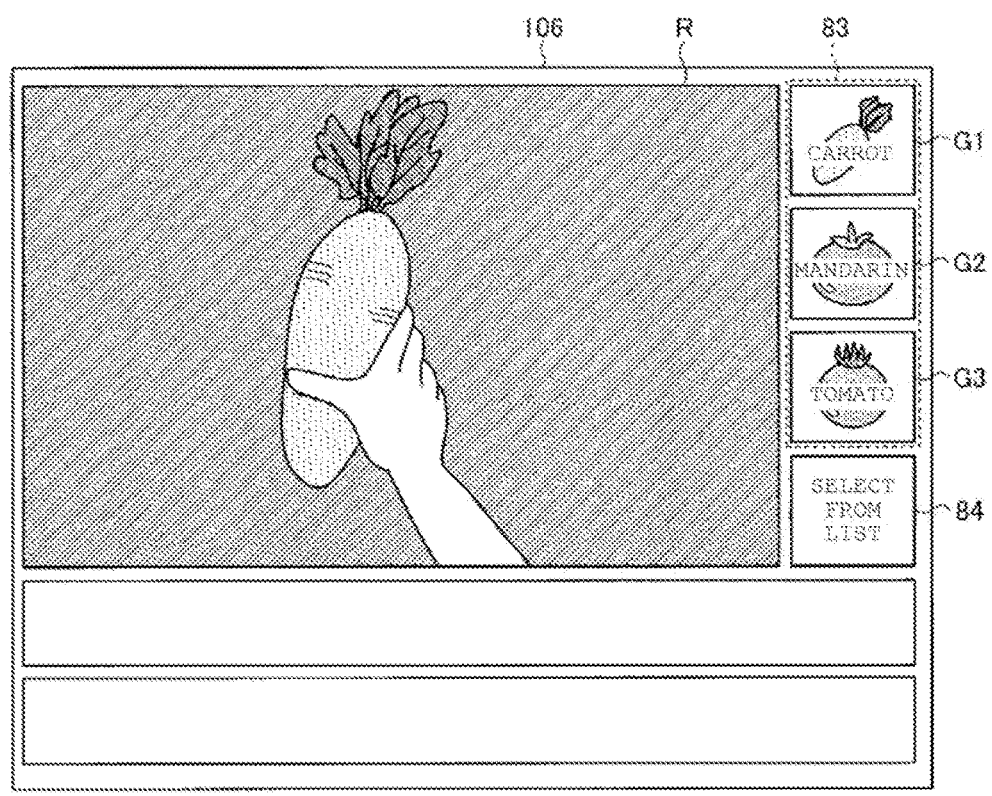
FIG. 8 illustrates a screen example in which images of merchandise candidates are displayed.

FIG. 8 illustrates a screen example in which illustration images G1, G2, and G3 of the merchandise candidates are displayed. As illustrated in FIG. 8, the illustration images G1, G2, and G3 and the merchandise names of the merchandise candidates are displayed in order of the degree of similarity in the merchandise candidate presentation area 83.

The illustration images G1, G2, and G3 can be selected according to the selection operation with respect to the touch panel 105. In addition, a selection button 84 for selecting the merchandise from a merchandise list is provided on a lower portion of the merchandise candidate presentation area 83. The merchandise selected from the merchandise list is processed as the determined merchandise described above. Although FIG. 8 illustrates the example in which three merchandise candidates corresponding to the illustration images G1, G2, and G3 are displayed, the number of merchandise candidates or the display method is not particularly limited. The merchandise images may be displayed as the merchandise candidates, instead of the illustration images.

In addition, the merchandise presentation unit 55 allows the display device 106 to display the information relating to the registered merchandise items which are the products of the different varieties belonging to the same category (merchandise) which satisfies the condition D, as the merchandise candidates. In detail, the merchandise presentation unit 55 reads out the illustration images and the merchandise names of the registered merchandise items (products of different varieties belonging to the same category) which satisfies the condition d from the PLU file F1, and outputs those in order of the degree of similarity calculated by the degree of similarity calculation unit 53 to the display device 106. The display device 106 displays the illustration images and the merchandise names of the merchandise candidates in order of the degree of similarity, in a variety selection screen 85 (see FIG. 9).

Figure 9:
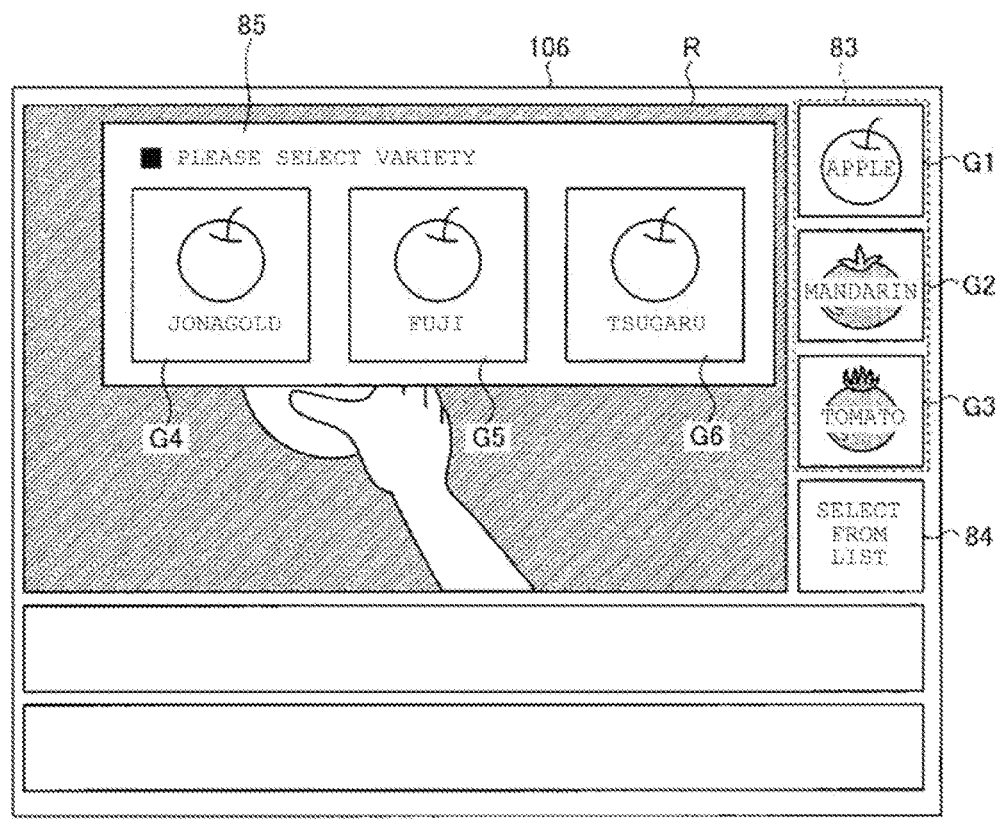
FIG. 9 illustrates an example of a variety selection screen of merchandise candidates.

FIG. 9 illustrates the variety selection screen 85 of the merchandise candidates. As illustrated in FIG. 9, illustration images G4, G5, and G6 and variety names of the merchandise candidates are displayed in the variety selection screen 85 which is superimposed on the frame image, in the order of the degree of similarity of the registered merchandise (products of different varieties belonging to the same category). The degree of similarity may also be displayed on the illustration images G4, G5, and G6 of the merchandise candidates. The illustration images G4, G5, and G6 maybe selected according to the selection operation with respect to the touch panel 105. Although FIG. 9 illustrates an example of displaying three merchandise candidates such as illustration images G4, G5, and G6 of the merchandise candidates which are products of different varieties belonging to the category (merchandise) of the illustration image G1, the number of merchandise candidates or the display method is not particularly limited. When there is a large number of the merchandise candidates, a button such as "select other varieties" or a scroll button may be provided and the illustration images of the merchandise candidates may be displayed in order by the button operation. The merchandise images (photographs) may be displayed as merchandise candidates, instead of the illustration images.

The input acceptance unit 57 functions as an acceptance section, and accepts various input operations from the display device 106 through the touch panel 105 or the keyboard 107. For example, the input acceptance unit 57 accepts an input operation (confirmation operation) for indicating that the merchandise of the displayed illustration image G1 is finally confirmed as the determined merchandise, based on the selection operation with respect to the confirmation screen 72 (see FIG. 7). The merchandise presentation unit 55 displays the decision screen 71 described above on the display device 106, when the input acceptance unit 57 accepted the confirmation operation.

The input acceptance unit 57 accepts the selection operation with respect to any one illustration image from the illustration images G1 to G3 (see FIG. 8) of the merchandise candidates displayed on the display device 106. The input acceptance unit 57 accepts the registered merchandise of the selected illustration image as the determined merchandise with respect to the merchandise G. When the merchandise detection unit 52 detects the plurality of merchandise items G, the input acceptance unit 57 may accept selection of the plurality of merchandise candidates from the merchandise candidates. When the input acceptance unit 57 accepts the selection operation, the merchandise presentation unit 55 allows the display device 106 to display the decision screen 71 which displays the accepted merchandise candidate as the determined merchandise.

The input acceptance unit 57 accepts the selection operation with respect to any one illustration image from the illustration images G4 to G6 (see FIG. 9) of the variety selection screen 85 displayed on the display device 106. When the input acceptance unit 57 accepts the selection operation, the merchandise presentation unit 55 allows the display device 106 to display the decision screen which displayed the accepted merchandise candidate as the determined merchandise.

The information input unit 58 provides information showing the merchandise (for example, merchandise ID or merchandise name) regarding the determined merchandise which is determined as described above, through the connection interface 175.

The information input unit 58 may provide the sales number that was separately input through the touch panel 105 or the keyboard 107, with the merchandise ID or the like.

The sales registration unit 59 performs sales registration of the corresponding merchandise item, based on the merchandise ID and the sales number provided by the information input unit 58. The sales registration unit 59 records the notified merchandise ID, the merchandise classification, the merchandise name, and the unit price corresponding to the merchandise ID with the sales number in a sales mater file, by referring the PLU file F1, to perform the sales registration.

Merchandise Dictionary Registration Process when Recognizing Object

Next, a merchandise dictionary registration process when recognizing an object by the image acquisition unit 51, the merchandise detection unit 52, the degree of similarity calculation unit 53, the degree of similarity determination unit 54, the product designation unit 91, the dictionary registration screen display unit 92, the dictionary registration unit 93, the determination unit 94, the test screen display unit 95, and the candidate presentation unit 96 of the POS terminal 11, will be described.

As described above, the POS terminal 11 employs the generic object recognition of determining the class of the products, based the degree of similarity obtained by comparing the feature amount of the target product extracted from image data imaged by the imaging unit 164, to the reference data (feature amount) in the PLU file F1 which is the dictionary prepared in advance.

The reference data is registered in the PLU file F1 which is the dictionary used for the generic object recognition, in advance. However, the products such as fruits and vegetables which are the recognition targets of the generic object recognition may have different texture or surface color depending on the product districts, even if they are the same variety. When the products have the different texture or color of the surface even if the products are the same variety, the degree of similarity obtained by comparing to the reference data (feature amount) registered in the PLU file F1 in advance may be decreased, and the object recognition rate may be decreased.

Herein, the POS terminal 11 performs dictionary registration of content of the PLU file F1 with the products such as fruits and vegetables actually offered for sale in a store, in order to achieve new registration of the reference data of the products such as fruits and vegetables with respect to the PLU file F1.

However, when performing the dictionary registration of the reference data (feature amount) in the PLU file F1 in the POS terminal 11, there are important points for each feature of the products each time when imaging the product to be a target by the imaging unit 164. For example, in order to image a long product such as a radish or a green onion, it is necessary to move the entire product in a longitudinal direction while twirling the longitudinal direction as a shaft. In addition, regarding a small product such as a citrus sudachi, it is necessary to capture, with the imaging unit 164, an image of the product but not to capture a hand of a salesperson who holds the product, as much as possible.

Herein, the POS terminal 11 of the embodiment is configured to display guidance for showing the important point for each property of the product which is the target imaged by the imaging unit 164, in the merchandise dictionary registration process when recognizing the object. That is, the CPU 61 of the POS terminal 11 functions as the image acquisition unit 51, the merchandise detection unit 52, the degree of similarity calculation unit 53, the degree of similarity determination unit 54, the product designation unit 91, the dictionary registration screen display unit 92, the dictionary registration unit 93, the determination unit 94, the test screen display unit 95, and the candidate presentation unit 96, as illustrated in FIG. 4, by executing the program PR2 for the dictionary registration process. Hereinafter, each unit of the merchandise dictionary registration process that is used when recognizing the object will be described.

The product designation unit 91 designates the dictionary registration target product from the PLU file F1 for storing the merchandise information according to the sales registration. A user selects the merchandise name of the dictionary registration target product from the list of the merchandise items stored in the PLU file F1, to perform the designation of the dictionary registration target product.

The dictionary registration screen display unit 92 displays a dictionary registration screen including a guidance display area for guidance display showing the important point for each property of the solid shape of the dictionary registration target product designated by the product designation unit 91, on the display device 106 of the merchandise reading device 101.

The image acquisition unit 51 acquires an image of the dictionary registration target product imaged by the imaging unit 164. The acquired image of the dictionary registration target product is displayed on an image display area 121a of a dictionary registration screen 121 which will be described later.

The dictionary registration unit 93 executes the dictionary registration process of extracting the reference data (feature amount) of the product from the images of the dictionary registration target products acquired by the image acquisition unit 51. The dictionary registration unit 93 also stores the extracted feature amount of the dictionary registration target product in the PLU file F1 in association with identification information of the dictionary registration target product. The dictionary registration unit 93 also adds the reference data (feature amount) to the dictionary registration target product registered in the PLU file F1 in advance.

Figure 10:
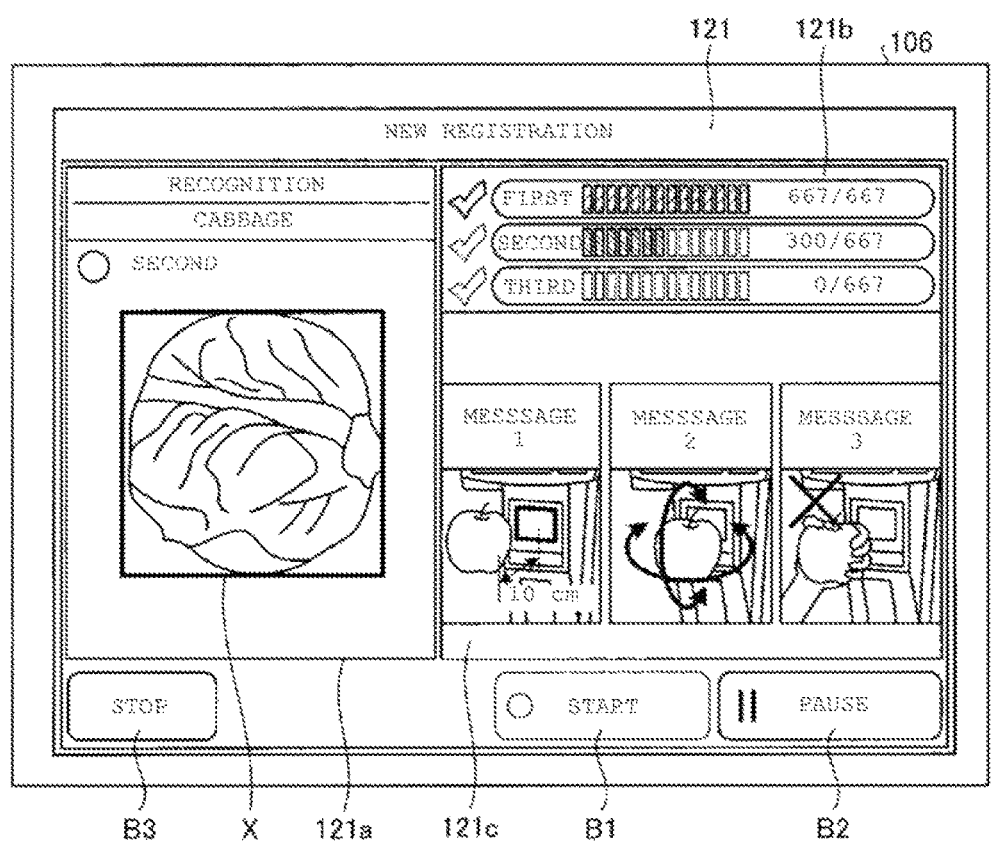
FIG. 10 illustrates an example of a dictionary registration screen.

FIG. 10 illustrates an example of the dictionary registration screen 121. As illustrated in FIG. 10, the dictionary registration screen 121 includes the image display area 121a for displaying the frame image imaged by the imaging unit 164 and acquired by the image acquisition unit 51, a progress bar 121b showing what order of the image of merchandise samples the frame image currently acquired is and showing the number of acquired frame images, a "start" button B1 for starting the dictionary registration process, a "pause" button B2 for pausing the dictionary registration process, and a "stop" button B3 for stopping the dictionary registration process. In the example of FIG. 10, although the number of acquired frame images of one merchandise item is set as 667, the number thereof is not limited thereto and may be suitably set.

When the "pause" button B2 is operated, the POS terminal 11 may execute the other process (for example, merchandise registration process or the like) after pausing the dictionary registration process. That is, the dictionary registration unit 93 has a retention function for executing the other process after pausing the dictionary registration process to hold the content subjected to the dictionary registration by the dictionary registration process in a storage unit. When the "stop" button B3 is operated, the POS terminal 11 displays a pop-up warning screen (not illustrated) notifying that the dictionary registration process is stopped and the dictionary registration content so far is not saved, on the dictionary registration screen 121. The POS terminal 11 stops the dictionary registration process when a "Yes" button on the warning screen is operated, and continues to execute the dictionary registration process when a "No" button on the warning screen is operated.

In addition, the dictionary registration screen 121 includes a guidance display area 121c showing the important points for each property of the solid shape of the target merchandise imaged by the imaging unit 164 with illustration. As the guidance display showing the important points for each property of the imaged target merchandise, the guidance shown below is used, for example:

1. Guidance showing distance imaging with respect to the imaging unit 164 which is in common with all merchandise items which are the imaging target.

2. Guidance for imaging the entirety of the product while rotating, regarding the spherical product (object) such as an apple.

3. Guidance for moving the entirety of the product in the longitudinal direction while rotating the product with the longitudinal direction as a shaft to image the entirety of the product, regarding a long product (object) such as a radish or a green onion.

4. Guidance for imaging the product so as not to have a hand of a salesperson who holds the product (object) in an image captured by the imaging unit 164 as much as possible, regarding a small product (object) such as a sudachi.

As illustrated in FIG. 3, the PLU file F1 stores one or more information items among the information items showing 1 to 4 described above, with respect to each merchandise item as guidance information.

For showing the important points for each property of the imaged target merchandise, in addition to only displaying the guidance corresponding to the property of the imaged target merchandise as described above, the guidance display corresponding to the property of the imaged target merchandise may be turned on and off or the color thereof may be changed.

The determination unit 94 determines whether or not the dictionary registration target product is held up to the imaging unit 164 according to the guidance display on the dictionary registration screen. When it is determined that an operator does not follow the guidance display by the determination unit 94, the dictionary registration screen display unit 92 further performs the guidance display showing the important points in the image display area 121*a* or the like on the dictionary registration screen 121.

The test screen display unit 95 displays a test screen on the display device 106 of the merchandise reading device 101. This test confirms the recognition of the dictionary registration target product stored in the PLU file F1, as a result of the dictionary registration process performed by the dictionary registration unit 93.

Figure 11:
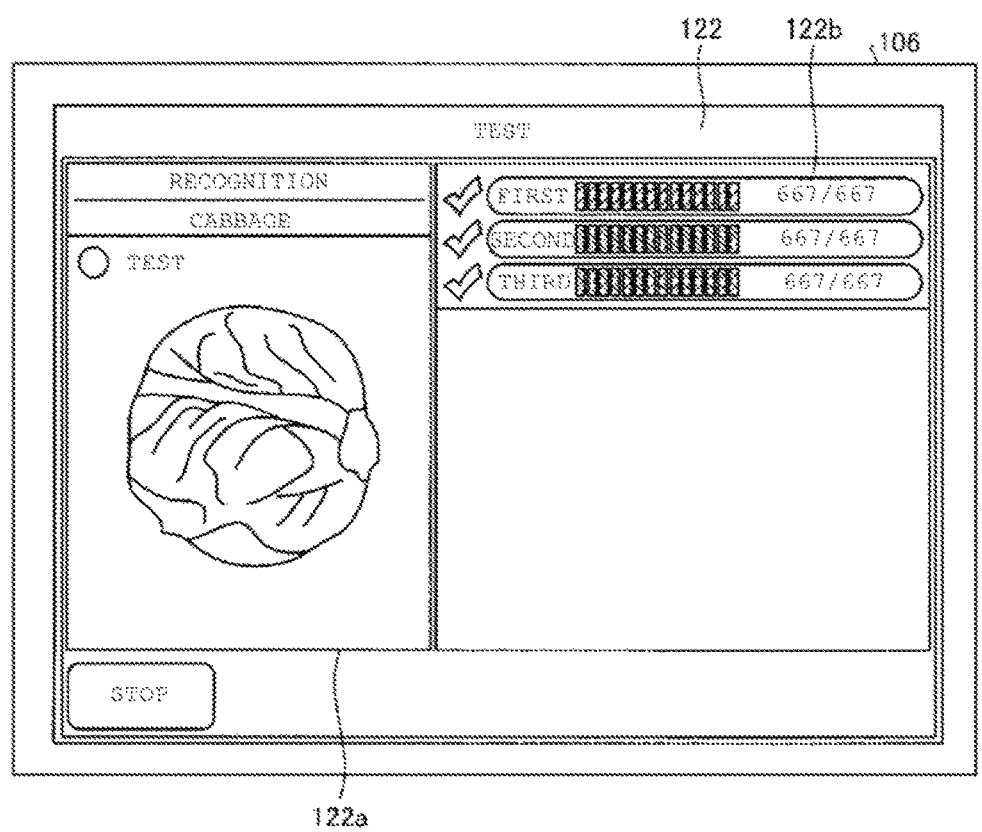
FIG. 11 illustrates an example of a test screen.

FIG. 11 illustrates an example of a test screen 122. As illustrated in FIG. 11, the test screen 122 includes an image display area 122*a* for displaying the frame image imaged by the imaging unit 164 and acquired by the image acquisition unit 51, and a progress bar 122*b* showing what order of the image of the merchandise samples the frame image currently acquired contrasts with.

The degree of similarity calculation unit 53 and the degree of similarity determination unit 54 may function together as a degree of similarity determination section. When the image of the dictionary registration target product is acquired after executing the dictionary registration process performed by the dictionary registration unit 93, the degree of similarity calculation unit 53 and the degree of similarity determination unit 54 calculate the degree of similarity of the acquired image of the dictionary registration target product and the image of the dictionary registration target product stored in the PLU file F1, to determine the dictionary registration target product of the candidates of the dictionary registration target product according to the plurality of conditions provided in a stepwise manner regarding the degree of similarity.

Figure 12:
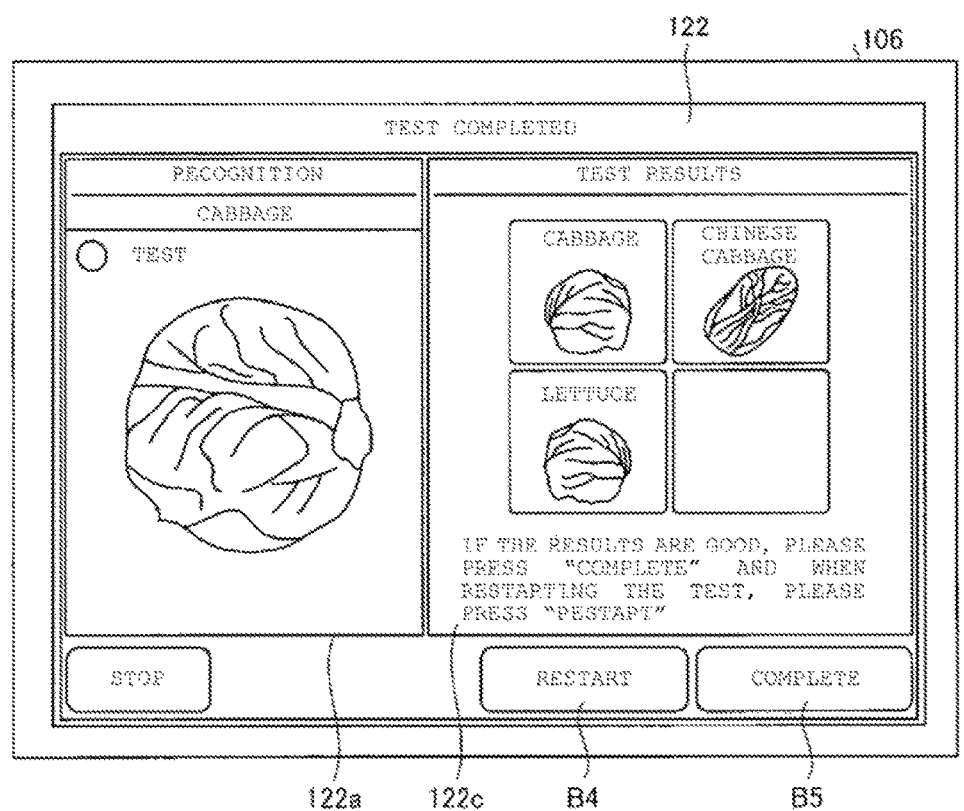
FIG. 12 is a diagram illustrating an example of a test screen.

FIG. 12 illustrates an example of the test screen 122. As illustrated in FIG. 12, after executing the dictionary registration process performed by the dictionary registration unit 93, the test screen 122 displays a test result display area 122*c*, displaying the illustration images and the merchandise names of the determined dictionary registration target product or the illustration images and the merchandise names of the dictionary registration target product selected as the candidates, instead of the progress bar 122*b*. Although FIG. 12 illustrates an example in which three candidates are displayed in order of degree of similarity, the number or the display method of the merchandise candidates is not particularly limited. In addition, the merchandise images (photographs) may be displayed instead of the illustration images.

The test screen 122 includes a "complete test" button B5 for completing the test, and a "restart" button B4 for redoing the dictionary registration process by acquiring an image again, on the lower portion of the test result display area 122*c*. When the "restart" button B4 is operated, the POS terminal 11 (dictionary registration unit 93) executes the dictionary registration process again. That is, the dictionary registration unit 93 has a dictionary registration redoing function of executing the operations of the image acquisition unit 51 and the dictionary registration unit 93 again, in accordance with the result of the decision or the result of the candidate selection by the test.

The candidate presentation unit 96 may function as a designation section. In the dictionary registration process when recognizing the object, the candidate presentation unit 96 displays a dictionary registration merchandise selection screen which presents one or a plurality of candidate groups recognized based on the image obtained by imaging the target product imaged by the imaging unit 164 on the display device 106 of the merchandise reading device 101, and designates the merchandise item to be the dictionary registration target.

As described above, one or a plurality of candidate groups are displayed on the display device 106 of the merchandise reading device 101 due to the following reason.

When performing the dictionary registration of the reference data of the product such as fruits and vegetables which are registered in the PLU file F1 in advance, it is not easy to display a list by only extracting the newly registered products as in the case of the new registration described above. In this case, a desirable merchandise name is selected from all products such as fruits and vegetables registered in the PLU file F1 in advance to execute the dictionary registration process of the selected merchandise item. However, time and effort may be required for an operator to select the merchandise item of the dictionary registration target in the dictionary registration process from all merchandise items registered in the PLU file F1 in advance.

Figure 13:
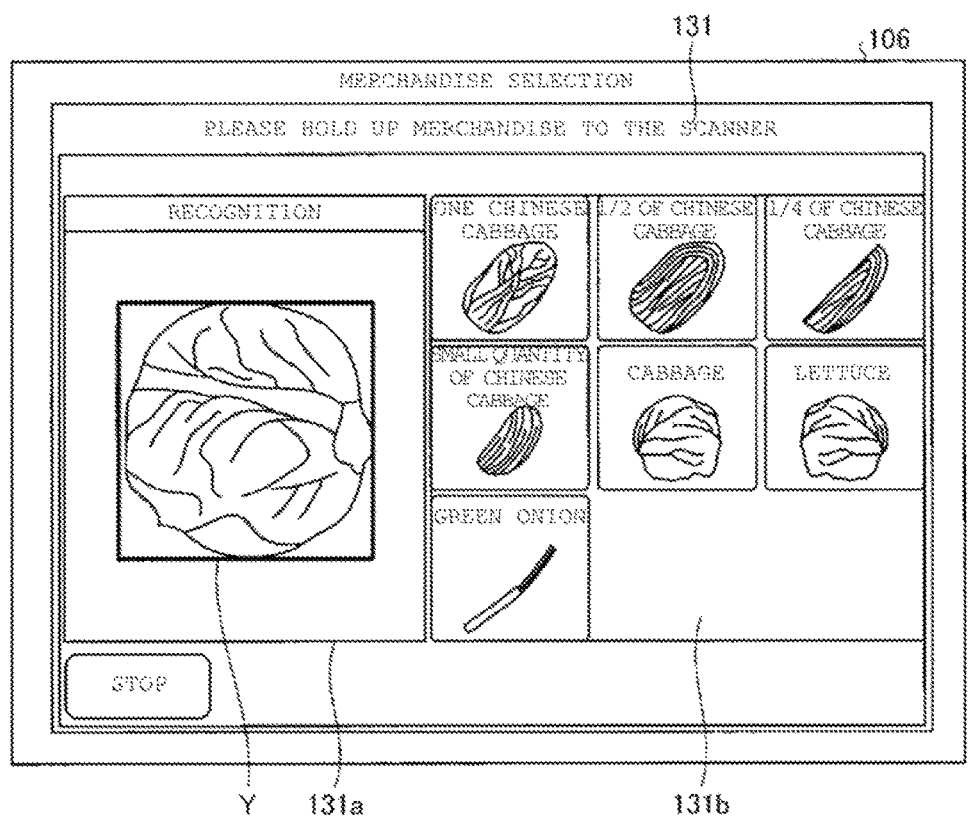
FIG. 13 illustrates an example of a dictionary registration merchandise selection screen.

FIG. 13 illustrates an example of a dictionary registration merchandise selection screen 131. As illustrated in FIG. 13, the dictionary registration merchandise selection screen 131 displays an image display area 131*a* for displaying the frame image imaged by the imaging unit 164 and acquired by the image acquisition unit 51, and a result display area 131*b* for displaying the illustration images and the merchandise names of the determined dictionary registration target product or the illustration images and the merchandise names of the dictionary registration target product selected as the candidates. Although FIG. 13 illustrates the example in which seven candidates are displayed in the order from the registration merchandise having high degree of similarity, the number or the display method of the merchandise candidates is not particularly limited. In addition, the merchandise images (photographs) maybe displayed instead of the illustration images.

Figure 14:
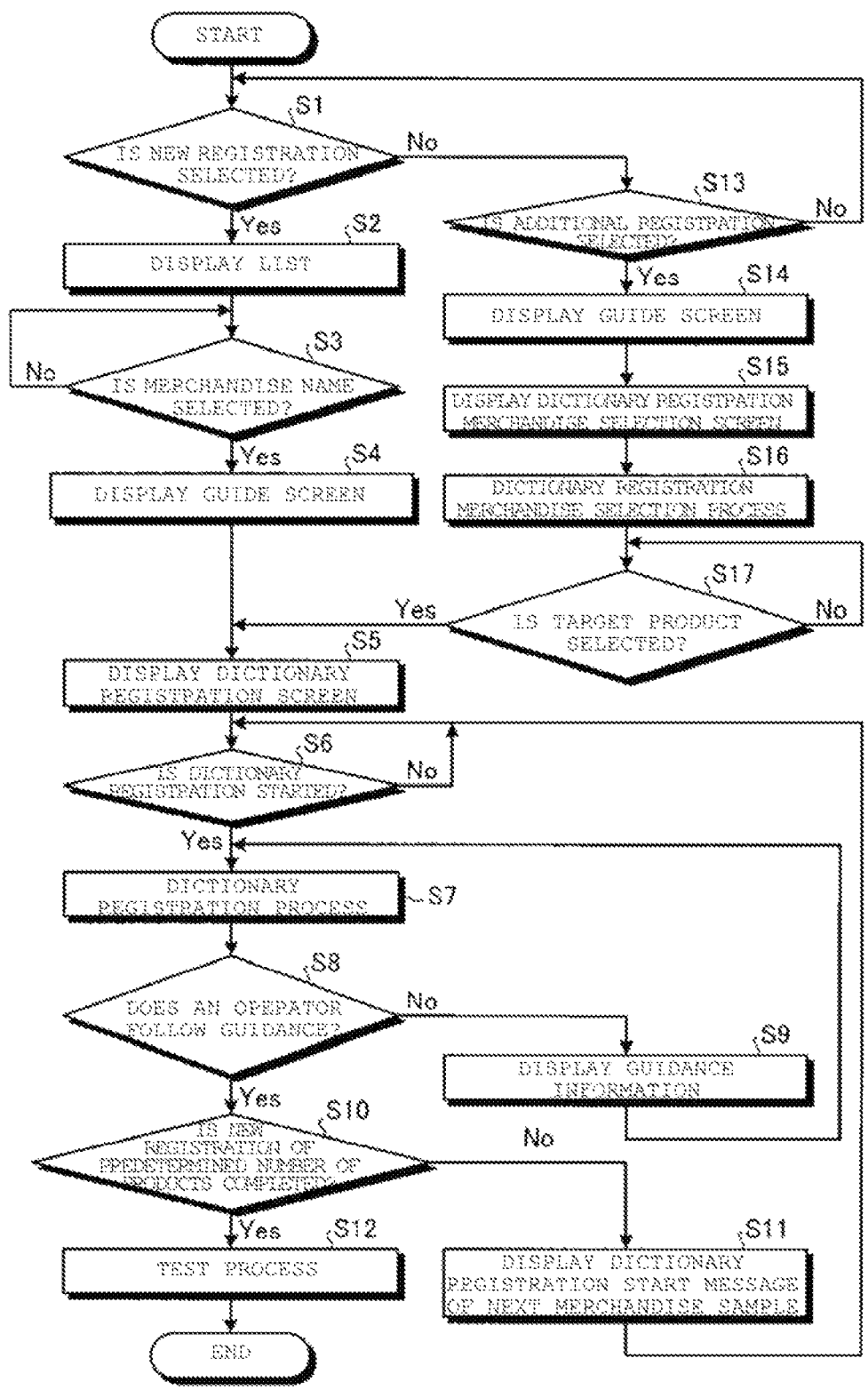
FIG. 14 is a flowchart illustrating an example sequence of operations of a dictionary registration process of merchandise.

Next, an operation of the checkout system 1 in the dictionary registration process will be described in detail. FIG. 14 is a flowchart illustrating an example sequence of operations of the dictionary registration process executed by the checkout system 1.

New Registration

As illustrated in FIG. 14, if the "new registration" is selected from "dictionary registration" menu of an operation selection screen (not illustrated) displayed on the display device 23 (Yes in Step S1), the CPU 61 (product designation unit 91) of the POS terminal 11 displays a dictionary list (not illustrated) obtained by only extracting the newly registered data items from the PLU file F1 on the display device 23 (Step S2). The dictionary list displayed on the display device 23 is obtained by extracting the merchandise items for which the reference data is not stored, among the merchandise items stored in the PLU file F1. Information items relating to the merchandise item such as the merchandise ID, the merchandise classification, the merchandise name, and the unit price of the merchandise item extracted as the newly registered data are displayed as a list in the dictionary list.

When the desirable merchandise name is selected from the dictionary list (Yes in Step S3), the CPU 61 of the POS terminal 11 displays a guide screen (including the merchandise name of the selected merchandise item, not illustrated) and guidance "Please prepare three merchandise samples for dictionary registration" on the display device 106 of the merchandise reading device 101 (Step S4).

That is, in the embodiment, the predetermined number (for example, three) of merchandise samples are subjected to the dictionary registration for one merchandise item. The guide screen includes an "OK" button for proceeding with the dictionary registration process and a "cancel" button for stopping the dictionary registration process.

Next, when the "OK" button is operated, the CPU 61 (dictionary registration screen display unit 92) of the POS terminal 11 displays the dictionary registration screen 121 illustrated in FIG. 10 on the display device 106 (Step S5) and promotes imaging of the dictionary registration target product which is the selected merchandise.

The CPU 61 of the POS terminal 11 performs the guidance display in the guidance display area 121c of the dictionary registration screen 121, by referring to the guidance information registered in the PLU file F1 in advance in association with the selected merchandise. That is, in the embodiment, the "important points" for an operator when performing the dictionary registration by holding up the dictionary registration target product to the reading window 103 of the merchandise reading device 101 are switched and displayed as illustration guidance for each property of the selected merchandise. Accordingly, an operator can reliably read the dictionary registration target product on the reading window 103 of the merchandise reading device 101.

In such a dictionary registration screen 121, when an operator holds up the dictionary registration target product to the reading window 103 of the merchandise reading device 101 according to the guidance, the entirety or a part of the dictionary registration target product is imaged in the reading area R of the imaging unit 164. When the "start" button B1 of the dictionary registration screen 121 is operated (Yes in Step S6), the CPU 61 (dictionary registration unit 93) of the POS terminal 11 starts the dictionary registration process (Step S7). During the dictionary registration process, the CPU 61 (dictionary registration unit 93) of the POS terminal 11 displays the frame image imaged by the imaging unit 164 and acquired by the image acquisition unit 51 in the image display area 121a of the dictionary registration screen 121. In addition, during the dictionary registration process, the CPU 61 (dictionary registration unit 93) of the POS terminal 11 displays the progress bar 121b which indicates the number of acquired frame images. That is, when performing the dictionary registration process, the dictionary registration unit 93 employs the images obtained by imaging the plurality of samples by the imaging unit 164, and provides notification of the order of the image acquired by the image acquisition unit 51. In addition, when performing the dictionary registration process, the dictionary registration unit 93 employs the plurality of images of the dictionary registration target product imaged by the imaging unit 164, and notifies the number of images acquired by the image acquisition unit 51.

During the dictionary registration process, the CPU 61 (dictionary registration unit 93) of the POS terminal 11 displays a frame X (see FIG. 10) which is a guideline surrounding the image area of the dictionary registration target product, to notify an operator that the dictionary registration process is in progress (acquisition of the frame image is in progress). A shape, a display position, a size, and a color of the frame X are not particularly limited as long as the fact that the dictionary registration process is in progress is clearly shown. The frame X may have a shape other than the rectangle, such as a circular or an oval shape. The size of the frame X may be larger than the image area of the dictionary registration target product or may be smaller than the image area of the dictionary registration target product. That is, when performing the dictionary registration process, the dictionary registration unit 93 displays the image of the dictionary registration target product acquired by the image acquisition unit 51 on the dictionary registration screen 121, and attaches the frame X which is the additional information showing that the dictionary registration process is in progress with respect to the image of the dictionary registration target product.

In addition, the CPU 61 (determination unit 94) of the POS terminal 11 determines whether or not an operator holds up the dictionary registration target product to the reading window 103 of the merchandise reading device 101 according to the guidance corresponding to the property of the captured target merchandise (Step S8). For example, for determining whether reading is executed according to the guidance information of "4" described above, a method of not executing the reading according to the guidance information when an area of a skin color area detected from the frame image in the merchandise detection unit 52 is greater than the threshold value is considered. In addition, for determining whether or not reading is executed according to the guidance information of "2" or "3" described above, a method of not executing the reading according to the guidance information when each dictionary registration target product detected from the frame images has no motion in the merchandise detection unit 52 is considered.

When it is determined that the reading is not executed according to the guidance information as described above (No in Step S8), the CPU 61 (determination unit 94) of the POS terminal 11 further displays the guidance information in the image display area 121a of the dictionary registration screen 121 (Step S9) and the process returns to Step S7. Accordingly, an operator can reliably perform the dictionary registration of the dictionary registration target product.

When it is determined that the acquiring of the predetermined number of frame images for the merchandise samples is completed, the CPU 61 (dictionary registration unit 93) of the POS terminal 11 determines whether or not the dictionary registration of the predetermined number of merchandise samples (herein, three) is completed (Step S10). When the dictionary registration of the predetermined number of merchandise samples (herein, three) is not completed (No in Step S10), a message indicating the start of the dictionary registration process of the next merchandise sample is displayed in the image display area 121a of the dictionary registration screen 121 (Step S11) and the process returns to Step S6.

Meanwhile, when the dictionary registration of the predetermined number of merchandise samples (herein, three) is completed (Yes in Step S10), the CPU 61 (dictionary registration unit 93) of the POS terminal 11 shows the completion of the dictionary registration and displays the guide screen (not illustrated) including the guidance "please hold up the sample to the scanner and start the recognition test". In addition, the guide screen includes a "test start" button for starting the recognition test.

When the "test start" button is operated, the CPU 61 (test screen display unit 95) of the POS terminal 11 displays the test screen 122 illustrated in FIG. 11 on the display device 106, and the CPU 61 (degree of similarity calculation unit 53 and the degree of similarity determination unit 54) of the POS terminal 11 starts the test process (Step S12).

In the test screen 122 described above, when an operator holds up the dictionary registration target product to the reading window 103 of the merchandise reading device 101, the entirety or a part of the dictionary registration target product is imaged in the reading area R of the imaging unit 164. The CPU 61 of the POS terminal 11 displays the frame image imaged by the imaging unit 164 and acquired by the image acquisition unit 51 in the image display area 122a of the test screen 122.

The CPU 61 (degree of similarity calculation unit 53 and the degree of similarity determination unit 54) of the POS terminal 11 compares the degree of similarity between the image of the dictionary registration target product and the images of three merchandise samples registered in the PLU file F1, for each frame image acquired by the image acquisition unit 51. The CPU 61 (degree of similarity calculation unit 53 and the degree of similarity determination unit 54) of the POS terminal 11 determines the dictionary registration target product or selects the candidates of the dictionary registration target product according to the plurality of conditions provided in a stepwise manner, based on the degree of similarity of the frame image of the dictionary registration target product imaged by the imaging unit 164 and the image of three merchandise samples registered in the PLU file F1.

The CPU 61 of the POS terminal 11 displays the illustration image and the merchandise name of the determined dictionary registration target product or the dictionary registration target product selected as the candidate, in the test result display area 122c (see FIG. 12) of the test screen 122 displayed on the display device 106 in order of the degree of similarity.

As described above, when the conditions for deciding the image of the target product imaged by the imaging unit 164 as the merchandise of the image of the merchandise sample registered in the PLU file F1 are satisfied, the registration test is completed. The plurality of conditions may be provided in a stepwise manner, as the conditions for determining the degree of similarity of the merchandise image of the target product and the images of three merchandise samples.

Additional Registration

Meanwhile, as illustrated in FIG. 14, if "additional registration" is selected from the "dictionary registration" menu of the operation selection screen (not illustrated) displayed on the display device 23 (No in Step S1 and Yes in Step S13), the CPU 61 (candidate presentation unit 96) of the POS terminal 11 displays the guide screen (not illustrated) including the guidance "Please prepare three merchandise samples for dictionary registration" with respect to the display device 106 of the merchandise reading device 101 (Step S14). The guide screen includes an "OK" button for proceeding with the dictionary registration process and a "cancel" button for stopping the dictionary registration process.

When the "OK" button is operated, the CPU 61 (candidate presentation unit 96) of the POS terminal 11 displays the merchandise selection screen 131 illustrated in FIG. 13 including the guidance "Please hold up the merchandise for additional registration to the scanner" on the display device 106 (Step S15).

In such a merchandise selection screen 131, when an operator holds up the dictionary registration target product to the reading window 103 of the merchandise reading device 101, the entirety or a part of the dictionary registration target product is imaged in the reading area R of the imaging unit 164. The CPU 61 (candidate presentation unit 96) of the POS terminal 11 displays the frame image imaged by the imaging unit 164 and acquired by the image acquisition unit 51 in the image display area 131a of the merchandise selection screen 131, and starts the merchandise selection process (Step S16). During the merchandise selection process, the CPU 61 (candidate presentation unit 96) of the POS terminal 11 displays the frame image imaged by the imaging unit 164 and acquired by the image acquisition unit 51 in the image display area 131a of the merchandise selection screen 131.

During the merchandise selection process, the CPU 61 (candidate presentation unit 96) of the POS terminal 11 displays a frame Y (see FIG. 13) which is a guideline surrounding the image area of the dictionary registration target product, to notify an operator that the merchandise selection process is in progress. A shape, a display position, a size, and a color of the frame Y are not particularly limited as long as the fact that the merchandise selection process is in progress is clearly shown. The frame may have a shape other than the rectangle such as a circular or an oval shape. The size of the frame Y may be larger than the image area of the dictionary registration target product or may be smaller than the image area of the dictionary registration target product.

Next, the CPU 61 (degree of similarity calculation unit 53 and the degree of similarity determination unit 54) of the POS terminal 11 compares the degree of similarity between the image of the dictionary registration target product acquired by the image acquisition unit 51 and the feature amount registered in the PLU file F1. The CPU 61 (degree of similarity calculation unit 53 and the degree of similarity determination unit 54) of the POS terminal 11 determines the dictionary registration target product or selects the candidates of the dictionary registration target product according to the plurality of conditions provided in a stepwise manner, regarding the degree of similarity of the frame image of the dictionary registration target product imaged by the imaging unit 164 and the feature amount registered in the PLU file F1.

The CPU 61 (candidate presentation unit 96) of the POS terminal 11 displays the illustration image and the merchandise name of the determined dictionary registration target product or the dictionary registration target product selected as the candidate, in the result display area 131b (see FIG. 13) of the merchandise selection screen 131 displayed on the display device 106 in order of degree of similarity. The screen for selecting the dictionary registration target product is substantially the same as the screen for displaying the merchandise candidate when performing the merchandise registration process based on the generic object recognition (object recognition). Owing to this, an operator does not have difficulty in operation.

As described above, when the desirable dictionary registration target product is selected from the dictionary registration target product or the candidates of the dictionary registration target product displayed in the result display area 131b of the merchandise selection screen 131 (Yes in Step S17), the CPU 61 of the POS terminal 11 allows the process to proceed to Step S5.

As described above, by displaying one or the plurality of candidate groups based on the image of the dictionary registration target product acquired by the image acquisition unit 51 on the display device 106 of the merchandise reading device 101, it is possible to easily select the merchandise of the dictionary registration target in the dictionary registration process from the merchandise registered in the PLU file F1 in advance.

As described above, according to the information processing apparatus of the embodiment, the dictionary registration process includes storing the image of the dictionary registration target product acquired by the image acquisition unit 51 in the PLU file F1 in association with the identification information of the dictionary registration target product, or adding the reference data to the dictionary registration target product registered in the PLU file F1, and is executed in advance. Accordingly, even when the products (objects) such as fruits and vegetables which are recognition targets of the generic object recognition have different textures or colors of surfaces depending on product districts although the products are the same variety, it is possible to prevent the degradation of the object recognition rate.

Although the POS terminal 11 includes the PLU file F1 in the embodiment, it is not limited thereto, and the merchandise reading device 101 may include the PLU file F1, or an external device to which the POS terminal 11 and the merchandise reading device 101 may access may include the PLU file F1.

The POS terminal 11 is applied as the information processing apparatus having functions of the image acquisition unit 51, the merchandise detection unit 52, the degree of similarity calculation unit 53, the degree of similarity determination unit 54, the product designation unit 91, the dictionary registration screen display unit 92, the dictionary registration unit 93, the determination unit 94, the test screen display unit 95, and the candidate presentation unit 96 in the embodiment, but this is not limited thereto, and the merchandise reading device 101 may be applied as the information processing apparatus which has the functions of the image acquisition unit 51, the merchandise detection unit 52, the degree of similarity calculation unit 53, the degree of similarity determination unit 54, the product designation unit 91, the dictionary registration screen display unit 92, the dictionary registration unit 93, the determination unit 94, the test screen display unit 95, and the candidate presentation unit 96 and outputs the calculated results or the determined results to the POS terminal 11. Although the reference data is considered to be the feature amount in the embodiment, the reference data maybe set as the imaged merchandise image (reference image).

Although the checkout system 1 configured with the POS terminal 11 and the merchandise reading device 101 as the store system is described in the embodiment, this is not limited thereto, and this may be applied to a single apparatus having the functions of the POS terminal 11 and the merchandise reading device 101. As the single apparatus having the functions of the POS terminal 11 and the merchandise reading device 101, a self-checkout apparatus (hereinafter, referred to as a self-service POS) installed and used in a store such as a supermarket may be used.

Figure 15:
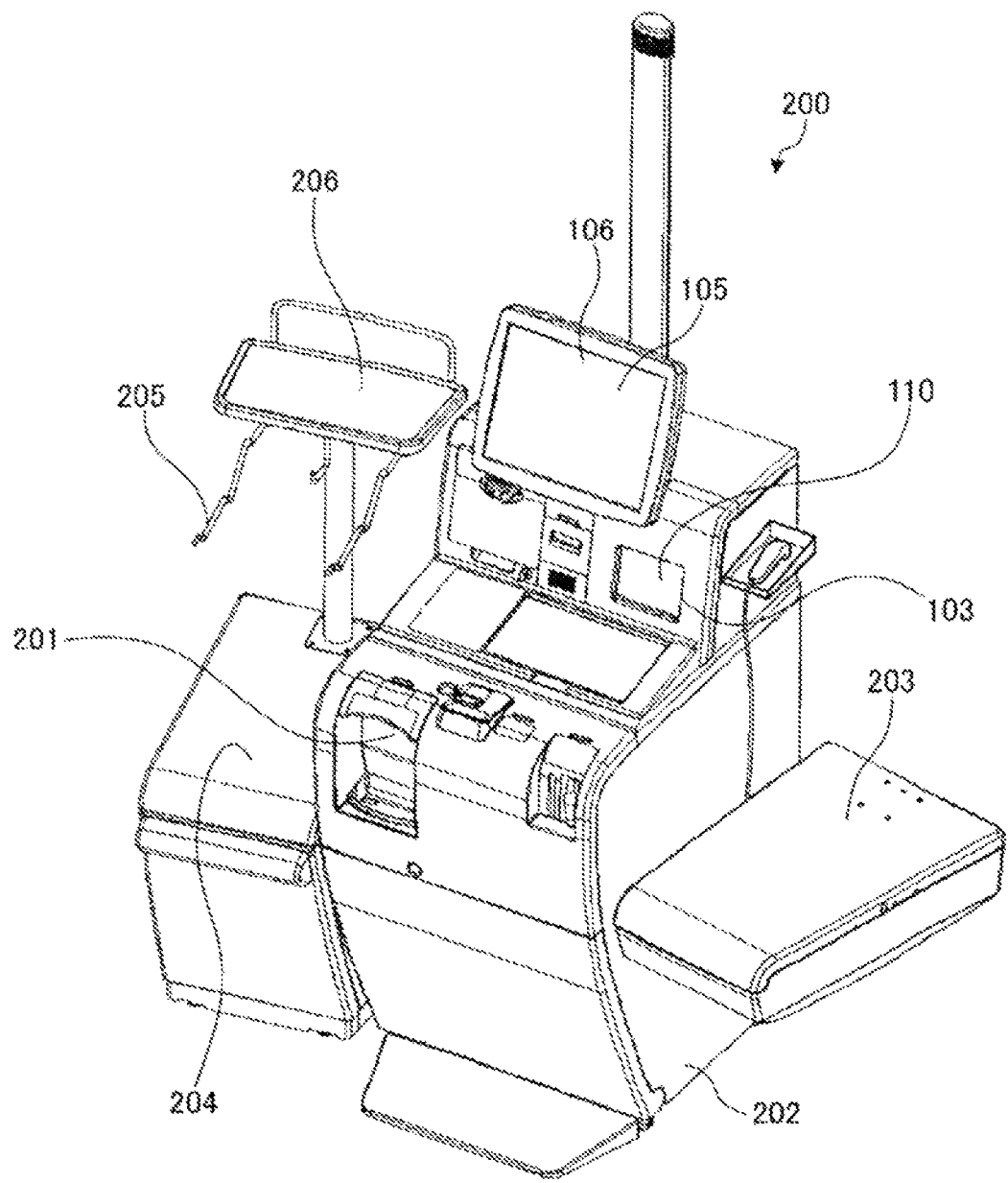
FIG. 15 is an appearance perspective view illustrating a configuration of a self-service POS station.
Figure 16:
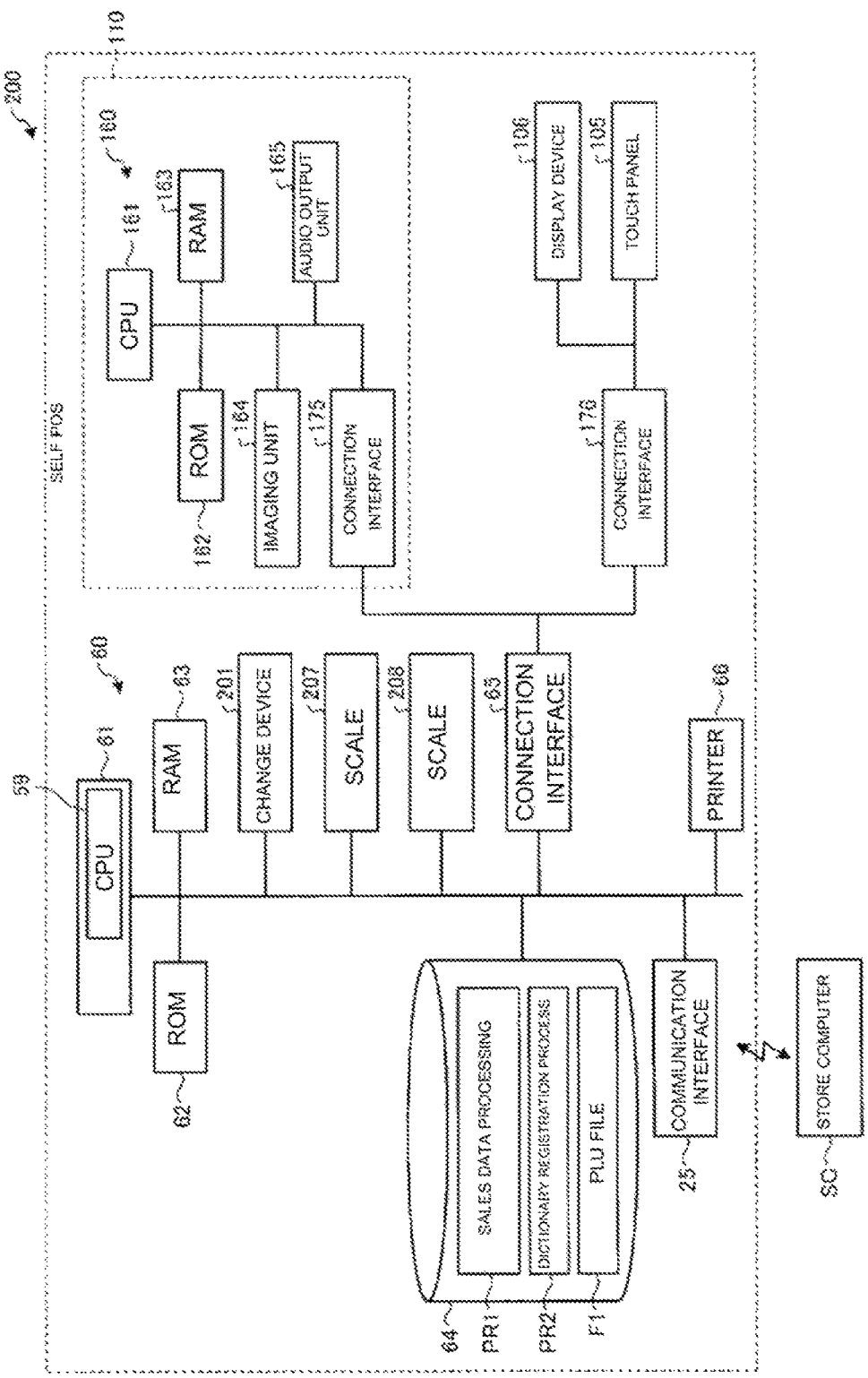
FIG. 16 is a block diagram illustrating a hardware configuration of a self-service POS station.

Herein, FIG. 15 is an appearance perspective view illustrating a configuration of a self-service POS 200, and FIG. 16 is a block diagram illustrating a hardware configuration of the self-service POS 200. Hereinafter, the same reference numerals are denoted for the same components described above and illustrated in FIG. 1 and FIG. 2, and the overlapped description will be omitted. As illustrated in FIG. 15 and FIG. 16, a main body 202 of the self-service POS 200 includes the display device 106 with the touch panel 105 is disposed on the surface, and the merchandise reading unit 110 which reads the merchandise image for determining the class of the merchandise.

A liquid crystal display is used, for example, as the display device 106. The display device 106 displays a guide screen for notifying a customer of an operation method of the self-service POS 200, various input screens, the registration screen for displaying the merchandise information read by the merchandise reading unit 110, the total price of the merchandise, a deposit amount or the change amount, and displays a payment screen for selecting a payment method.

A customer holds up a code symbol attached to the merchandise to the reading window 103 of the merchandise reading unit 110 so that merchandise reading unit 110 reads the merchandise image by the imaging unit 164.

A merchandise loading table 203 for placing the merchandise items in a basket which are not yet calculated is provided on the right side of the main body 202, a merchandise loading table 204 for placing the merchandise items which are already calculated is provided on the left side of the main body 202, and a bag holding hook 205 for holding a bag for putting the paid merchandise items or a temporary table 206 for temporarily placing the paid merchandise items before putting in the bag is provided. Scales 207 and 208 are provided in the merchandise loading tables 203 and 204, respectively, and have a function of confirming that the weight of the merchandise items before and after calculation is the same.

A change device 201 for performing exchange of paper money for payment and for change, as needed, is provided on the main body 202 of the self-service POS 200.

When the self-service POS 200 having such a configuration is applied to the store system, the self-service POS 200 functions as the information processing apparatus.

Although a program executed in each device of the embodiment is provided by being installed in a storage medium (ROM or a storage unit) included by each device in advance, it is not limited thereto, and may be provided by being recorded in a computer-readable recording medium such as a CD-ROM, a flexible disk (FD), a CD-R, or a digital versatile disk (DVD) as a file having a installable format or executable format. The storage medium is not limited to an independent medium such as a computer or a installation system, and a storage medium in which a program transmitted through a LAN, the Internet or the like is downloaded to be stored or temporarily stored, is also included.

The program executed by each device of the embodiment may be stored in a computer connected to a network such as the Internet and be provided by downloading through the network, or may be provided or delivered through the network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:

1. A product identification apparatus comprising:
a storage device having stored therein a dictionary for object recognition, the dictionary containing reference data of each of a plurality of products in association with identification information of the product;
an imaging section configured to capture image data of a target product; and a processor configured to perform a dictionary registration process which is different from a merchandise registration process, the dictionary registration process including:
  extracting reference data of the target product from the image data captured by the imaging section,
  calculating a degree of similarity between the extracted reference data of the target product and previously stored reference data stored in the dictionary,
  determining one or more of the plurality of products for which reference data has been previously stored in the dictionary and for which the calculated degree of similarity is above a predetermined value,
  controlling a display unit to display the determined one or more of the plurality of products in order of the calculated degree of similarity, and
  upon receiving an input selecting a single product from the one or more of the plurality of product displayed on the display, causing the storage device to add the extracted reference data corresponding to the selected single product to previously stored reference data in association with the identification information of the selected single product, such that object recognition rate can be improved when object recognition is subsequently performed on the selected single product using the dictionary with the added reference data.

2. The apparatus according to claim 1, wherein the processor is further configured to:
  obtain a plurality of images captured as image data by the imaging section, and
  provide a notification on the display unit indicating a number of a current obtained image compared to a total number of images obtained.

3. The apparatus according to claim 2, wherein the processor is further configured to:
  extract the reference data of the target product from the plurality of obtained images, and
  provide a notification on the display indicating a total number of images captured as image data by the imaging section.

4. The apparatus according to claim 1, wherein the processor is further configured to control the display unit to display the image data captured by the imaging section and to display information indicating that registration of the target product is in progress.

5. The apparatus according to claim 1, wherein the processor is further configured to:
  based on a pause operation input by a user, pause the dictionary registration process and execute one or more other processes as instructed by the user.

6. The apparatus according to claim 1, wherein the processor is further configured to:
  retrieve from the storage device sales information corresponding to the selected single product, and
  perform a sales registration process based on the retrieved sales information.

7. A method of product identification with improvement in object recognition rate, the method comprising the steps of:
  storing in a storage device a dictionary for object recognition, the dictionary containing reference data of each of a plurality of products in association with identification information of the product;
  capturing image data of a target product;
  extracting reference data of the target product from the captured image data; and
  performing a dictionary registration process which is different from a merchandise registration process, by:
    extracting reference data of the target product from the captured image data,
    calculating a degree of similarity between the extracted reference data of the target product and previously stored reference data stored in the dictionary, determining one or more of the plurality of products for which reference data has been previously stored in the dictionary and for which the calculated degree of similarity is above a predetermined value,
    controlling a display unit to display the determined one or more of the plurality of products in order of the calculated degree of similarity, and
    upon receiving an input selecting a single product from the one or more of the plurality of product displayed on the display, causing the storage device to add the extracted reference data corresponding to the selected single product to previously stored reference data in association with the identification information of the selected single product, such that object recognition rate can be improved when object recognition is subsequently performed on the selected single product using the dictionary with the added reference data.

8. The method according to claim 7, further comprising the steps of:
  obtaining a plurality of images captured as the image data; and
  providing a notification on the display unit indicating a number of a current obtained image compared to a total number of images obtained.

9. The method according to claim 8, further comprising the steps of:
  extracting the reference data of the target product from the plurality of obtained images; and
  provide a notification on the display indicating a total number of images captured as image data by the imaging section.

10. The method according to claim 7, further comprising the steps of:
  displaying on the display the captured image data; and
  displaying on the display information indicating that registration of the target product is in progress.

11. The method according to claim 7, further comprising the steps of:
  receiving an input of a pause operation from a user; and
  based on the input pause operation, pausing one or more of the steps and executing one or more other processes as instructed by the user.

12. The method according to claim 7, further comprising the steps of:
  retrieving from the storage device sales information corresponding to the selected single product, and
  performing a sales registration process based on the retrieved sales information.

13. A non-transitory computer readable medium containing instructions that cause a product identification apparatus to perform a method of product identification with improvement in object recognition rate, the method comprising the steps of:
  storing in a storage device a dictionary for object recognition, the dictionary containing reference data of each of a plurality of products in association with identification information of the product; capturing image data of a target product;

extracting reference data of the target product from the captured image data; and performing a dictionary registration process which is different from a merchandise registration process, by:
- extracting reference data of the target product from the captured image data,
- calculating a degree of similarity between the extracted reference data of the target product and previously stored reference data stored in the dictionary, determining one or more of the plurality of products for which reference data has been previously stored in the dictionary and for which the calculated degree of similarity is above a predetermined value,
- controlling a display unit to display the determined one or more of the plurality of products in order of the calculated degree of similarity, and
- upon receiving an input selecting a single product from the one or more of the plurality of product displayed on the display, causing the storage device to add the extracted reference data corresponding to the selected single product to previously stored reference data in association with the identification information of the selected single product, such that object recognition rate can be improved when object recognition is subsequently performed on the selected single product using the dictionary with the added reference data.

14. The computer readable medium according to claim 13, wherein the method of product identification further comprises the steps of:

obtaining a plurality of images captured as the image data; and providing a notification on the display unit indicating a number of a current obtained image compared to a total number of images obtained.

15. The computer readable medium according to claim 14, wherein the method of product identification further comprises the steps of:

extracting the reference data of the target product from the plurality of obtained images; and provide a notification on the display indicating a total number of images captured as image data by the imaging section.

16. The computer readable medium according to claim 13, wherein the method of product identification further comprises the steps of:

displaying on the display the captured image data; and displaying on the display information indicating that registration of the target product is in progress.

17. The computer readable medium according to claim 13, wherein the method of product identification further comprises the steps of:

retrieving from the storage device sales information corresponding to the selected single product, and performing a sales registration process based on the retrieved sales information.

\* \* \* \* \*